United States Patent
Stolfo et al.

(10) Patent No.: US 8,931,094 B2
(45) Date of Patent: *Jan. 6, 2015

(54) SYSTEM AND METHODS FOR DETECTING MALICIOUS EMAIL TRANSMISSION

(71) Applicant: Trustees of Columbia University in the City of New York, New York, NY (US)

(72) Inventors: Salvatore J. Stolfo, Ridgewood, NJ (US); Eleazar Eskin, Santa Monica, CA (US); Shlomo Herskop, Brooklyn, NY (US); Manasi Bhattacharyya, Flushing, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/848,529

(22) Filed: Mar. 21, 2013

(65) Prior Publication Data

US 2013/0239210 A1    Sep. 12, 2013

Related U.S. Application Data

(63) Continuation of application No. 12/633,493, filed on Dec. 8, 2009, now Pat. No. 8,443,441, which is a continuation of application No. 10/222,632, filed on Aug. 16, 2002, now Pat. No. 7,657,935.

(60) Provisional application No. 60/340,197, filed on Dec. 14, 2001, provisional application No. 60/312,703, filed on Aug. 16, 2001.

(51) Int. Cl.
*G06F 11/00* (2006.01)
*H04L 29/06* (2006.01)
*H04L 12/58* (2006.01)

(52) U.S. Cl.
CPC .......... *H04L 63/1425* (2013.01); *H04L 12/585* (2013.01); *H04L 51/12* (2013.01); *H04L 63/145* (2013.01)
USPC ............................................. 726/22; 709/206

(58) Field of Classification Search
None
See application file for complete search history.

(56) References Cited

U.S. PATENT DOCUMENTS

| | | | |
|---|---|---|---|
| 5,278,901 A | 1/1994 | Shieh et al. | |
| 5,280,626 A | 1/1994 | Kondo et al. | |
| 5,448,722 A | 9/1995 | Lynne et al. | |
| 5,452,442 A | 9/1995 | Kephart | |

(Continued)

FOREIGN PATENT DOCUMENTS

| | | |
|---|---|---|
| JP | 11-167533 | 6/1999 |
| JP | 2001-034554 | 2/2001 |

(Continued)

OTHER PUBLICATIONS

U.S. Appl. No. 10/327,811, (Abandoned), filed Dec. 19, 2002.

(Continued)

*Primary Examiner* — Fikremariam A Yalew
(74) *Attorney, Agent, or Firm* — Baker Botts, L.L.P.

(57) ABSTRACT

A system and methods of detecting an occurrence of a violation of an email security policy of a computer system. A model relating to the transmission of prior emails through the computer system is defined which is derived from statistics relating to the prior emails. For selected emails to be analyzed, statistics concerning the selected email are gathered. Such statistics may refer to the behavior or other features of the selected emails, attachments to emails, or email accounts. The determination of whether a violation of an email security policy has occurred is performed by applying the model of prior email transmission to the statistics relating to the selected email. The model may be statistical or probabilistic. A model of prior email transmission may include grouping email recipients into cliques. A determination of a violation of a security policy may occur if email recipients for a particular email are in more than one clique.

11 Claims, 15 Drawing Sheets

(56) References Cited

U.S. PATENT DOCUMENTS

| | | |
|---|---|---|
| 5,485,575 A | 1/1996 | Chess et al. |
| 5,511,163 A | 4/1996 | Lerche et al. |
| 5,557,742 A | 9/1996 | Smaha et al. |
| 5,621,889 A | 4/1997 | Lermuzeaux et al. |
| 5,649,095 A | 7/1997 | Cozza |
| 5,675,711 A | 10/1997 | Kephart et al. |
| 5,765,170 A | 6/1998 | Morikawa |
| 5,832,208 A | 11/1998 | Chen et al. |
| 5,907,834 A | 5/1999 | Kephart et al. |
| 5,951,698 A | 9/1999 | Chen et al. |
| 5,960,170 A | 9/1999 | Chen et al. |
| 6,006,329 A | 12/1999 | Chi |
| 6,016,546 A | 1/2000 | Kephart et al. |
| 6,108,786 A | 8/2000 | Knowlson |
| 6,161,130 A | 12/2000 | Horvitz et al. |
| 6,263,348 B1 | 7/2001 | Kathrow et al. |
| 6,266,664 B1 | 7/2001 | Russell-Falla et al. |
| 6,275,850 B1 | 8/2001 | Beyda et al. |
| 6,321,338 B1 | 11/2001 | Porras et al. |
| 6,336,109 B2 | 1/2002 | Howard |
| 6,338,141 B1 | 1/2002 | Wells |
| 6,347,374 B1 | 2/2002 | Drake et al. |
| 6,357,008 B1 | 3/2002 | Nachenberg |
| 6,405,318 B1 | 6/2002 | Rowland |
| 6,434,745 B1 | 8/2002 | Conley et al. |
| 6,513,122 B1 | 1/2003 | Magdych et al. |
| 6,519,703 B1 | 2/2003 | Joyce |
| 6,530,024 B1 | 3/2003 | Proctor |
| 6,567,808 B1 | 5/2003 | Eschelbeck et al. |
| 6,594,686 B1 | 7/2003 | Edwards et al. |
| 6,597,777 B1 | 7/2003 | Ho |
| 6,598,076 B1 | 7/2003 | Chang et al. |
| 6,622,134 B1 | 9/2003 | Sorkin |
| 6,647,400 B1 | 11/2003 | Moran |
| 6,671,811 B1 | 12/2003 | Diep et al. |
| 6,681,331 B1 | 1/2004 | Munson et al. |
| 6,694,303 B1 | 2/2004 | Agrawal et al. |
| 6,697,950 B1 | 2/2004 | Ko |
| 6,698,016 B1 | 2/2004 | Ghizzoni |
| 6,704,874 B1 | 3/2004 | Porras et al. |
| 6,735,700 B1 | 5/2004 | Flint et al. |
| 6,735,703 B1 | 5/2004 | Kilpatrick et al. |
| 6,742,124 B1 | 5/2004 | Kilpatrick et al. |
| 6,763,462 B1 | 7/2004 | Marsh |
| 6,769,066 B1 | 7/2004 | Botros et al. |
| 6,772,346 B1 | 8/2004 | Chess et al. |
| 6,775,780 B1 | 8/2004 | Muttik |
| 6,778,995 B1 | 8/2004 | Gallivan |
| 6,785,818 B1 | 8/2004 | Sobel et al. |
| 6,789,202 B1 | 9/2004 | Ko et al. |
| 6,813,682 B2 | 11/2004 | Bress et al. |
| 6,820,081 B1 | 11/2004 | Kawai et al. |
| 6,826,609 B1 | 11/2004 | Smith et al. |
| 6,826,694 B1 | 11/2004 | Dutta et al. |
| 6,839,850 B1 | 1/2005 | Campbell et al. |
| 6,856,694 B2 | 2/2005 | Farmer et al. |
| 6,888,548 B1 | 5/2005 | Gallivan |
| 6,898,712 B2 | 5/2005 | Vignoles et al. |
| 6,907,430 B2 | 6/2005 | Chong et al. |
| 6,910,135 B1 | 6/2005 | Grainger |
| 6,928,549 B2 | 8/2005 | Brock et al. |
| 6,938,161 B2 | 8/2005 | Vignoles et al. |
| 6,957,259 B1 * | 10/2005 | Malik ........................... 709/225 |
| 6,963,983 B2 | 11/2005 | Munson et al. |
| 6,970,924 B1 | 11/2005 | Chu |
| 6,971,019 B1 | 11/2005 | Nachenberg |
| 6,973,577 B1 | 12/2005 | Kouznetsov |
| 6,978,274 B1 | 12/2005 | Gallivan et al. |
| 6,983,380 B2 | 1/2006 | Ko |
| 7,007,299 B2 | 2/2006 | Ioele et al. |
| 7,013,483 B2 | 3/2006 | Cohen et al. |
| 7,016,939 B1 | 3/2006 | Rothwell et al. |
| 7,032,031 B2 | 4/2006 | Jungck et al. |
| 7,035,876 B2 | 4/2006 | Kawai et al. |
| 7,039,953 B2 | 5/2006 | Black et al. |
| 7,043,758 B2 | 5/2006 | Grupe |
| 7,065,657 B1 | 6/2006 | Moran |
| 7,065,789 B1 | 6/2006 | Neyman et al. |
| 7,076,527 B2 | 7/2006 | Bellegarda et al. |
| 7,080,076 B1 | 7/2006 | Williamson et al. |
| 7,092,992 B1 | 8/2006 | Yu |
| 7,093,239 B1 | 8/2006 | van der Made |
| 7,146,305 B2 | 12/2006 | van der Made |
| 7,162,741 B2 | 1/2007 | Eskin et al. |
| 7,181,768 B1 | 2/2007 | Ghosh et al. |
| 7,188,367 B1 | 3/2007 | Edwards et al. |
| 7,188,369 B2 | 3/2007 | Ho et al. |
| 7,225,343 B1 | 5/2007 | Honig et al. |
| 7,243,373 B2 | 7/2007 | Muttik et al. |
| 7,272,855 B1 | 9/2007 | Yemeni et al. |
| 7,376,970 B2 | 5/2008 | Marinescu |
| 7,392,543 B2 | 6/2008 | Szor |
| 7,424,619 B1 | 9/2008 | Fan et al. |
| 7,448,084 B1 | 11/2008 | Apap et al. |
| 7,461,402 B1 | 12/2008 | Lyle et al. |
| 7,475,405 B2 | 1/2009 | Manganaris et al. |
| 7,478,077 B2 | 1/2009 | Berger et al. |
| 7,487,544 B2 | 2/2009 | Schultz et al. |
| 7,492,720 B2 | 2/2009 | Pruthi et al. |
| 7,502,939 B2 | 3/2009 | Radatti |
| 7,574,740 B1 | 8/2009 | Kennis |
| 7,607,171 B1 | 10/2009 | Marsden et al. |
| 7,657,935 B2 | 2/2010 | Stolfo et al. |
| 7,735,138 B2 | 6/2010 | Zhao |
| 7,779,472 B1 | 8/2010 | Lou |
| 7,818,797 B1 | 10/2010 | Fan et al. |
| 7,836,503 B2 | 11/2010 | Tarquini et al. |
| 8,108,929 B2 | 1/2012 | Agrawal |
| 8,443,441 B2 | 5/2013 | Stolfo et al. |
| 8,528,086 B1 | 9/2013 | Aziz |
| 8,544,087 B1 | 9/2013 | Eskin et al. |
| 2002/0026605 A1 | 2/2002 | Terry |
| 2002/0046275 A1 | 4/2002 | Crosbie et al. |
| 2002/0059383 A1 | 5/2002 | Katsuda |
| 2002/0059418 A1 * | 5/2002 | Bird et al. ..................... 709/224 |
| 2002/0065892 A1 | 5/2002 | Malik |
| 2002/0082886 A1 | 6/2002 | Manganaris et al. |
| 2002/0083343 A1 | 6/2002 | Crosbie et al. |
| 2002/0133721 A1 | 9/2002 | Adjaoute |
| 2002/0138755 A1 | 9/2002 | Ko |
| 2002/0161763 A1 | 10/2002 | Ye et al. |
| 2002/0197978 A1 | 12/2002 | Zavidniak |
| 2003/0051026 A1 | 3/2003 | Carter et al. |
| 2003/0065926 A1 | 4/2003 | Schultz et al. |
| 2003/0070003 A1 | 4/2003 | Chong et al. |
| 2003/0110274 A1 | 6/2003 | Pazi |
| 2003/0167402 A1 | 9/2003 | Stolfo et al. |
| 2003/0172167 A1 | 9/2003 | Judge et al. |
| 2003/0188189 A1 | 10/2003 | Desai et al. |
| 2004/0172557 A1 | 9/2004 | Nakae et al. |
| 2005/0015624 A1 | 1/2005 | Ginter et al. |
| 2005/0182969 A1 | 8/2005 | Ginter et al. |
| 2005/0188272 A1 | 8/2005 | Bodorin et al. |
| 2006/0080656 A1 | 4/2006 | Cain et al. |
| 2006/0174319 A1 | 8/2006 | Kraemer et al. |
| 2007/0006303 A1 | 1/2007 | Donnelly et al. |
| 2007/0239999 A1 | 10/2007 | Honig et al. |
| 2008/0010251 A1 | 1/2008 | Fontoura et al. |
| 2010/0169970 A1 | 7/2010 | Stolfo et al. |
| 2013/0031633 A1 | 1/2013 | Honig et al. |

FOREIGN PATENT DOCUMENTS

| | | |
|---|---|---|
| JP | 2001-134433 | 5/2001 |
| JP | 2002-342106 | 11/2002 |
| JP | 2004-038273 | 2/2004 |
| WO | WO 02/097624 | 12/2002 |
| WO | WO 2007/006994 | 1/2007 |

OTHER PUBLICATIONS

U.S. Appl. No. 13/987,690, filed Aug. 20, 2013.
U.S. Appl. No. 10/208,402, Nov. 30, 2006 Issue Fee payment.
U.S. Appl. No. 10/208,402, Aug. 31, 2006 Notice of Allowance.

(56) References Cited

OTHER PUBLICATIONS

U.S. Appl. No. 10/208,402, May 22, 2006 Response to Non-Final Office Action.
U.S. Appl. No. 10/208,402, Feb. 10, 2006 Non-Final Office Action.
U.S. Appl. No. 10/208,432, Dec. 23, 2008 Issue Fee payment.
U.S. Appl. No. 10/208,432, Nov. 3, 2008 Notice of Allowance.
U.S. Appl. No. 10/208,432, Aug. 13, 2008 Amendment and Response to Election Requirement.
U.S. Appl. No. 10/208,432, Jul. 30, 2008 Election Requirement.
U.S. Appl. No. 10/208,432, Jun. 13, 2008 Response to Non-Final Office Action.
U.S. Appl. No. 10/208,432, Mar. 18, 2008 Non-Final Office Action.
U.S. Appl. No. 10/208,432, Dec. 28, 2007 Response to Notice of Non-Compliant.
U.S. Appl. No. 10/208,432, Nov. 30, 2007 Notice of Non-Compliant.
U.S. Appl. No. 10/208,432, Nov. 13, 2007 Response to Non-Final Office Action.
U.S. Appl. No. 10/208,432, Jul. 12, 2007 Non-Final Office Action.
U.S. Appl. No. 10/208,432, Apr. 23, 2007 Pre-Brief Appeal Conference Decision.
U.S. Appl. No. 10/208,432, Mar. 13, 2007 Notice of Appeal and Pre-Brief Conference Request.
U.S. Appl. No. 10/208,432, Nov. 14, 2006 Final Office Action.
U.S. Appl. No. 10/208,432, Aug. 29, 2006 Response to Non-Final Office Action.
U.S. Appl. No. 10/208,432, Mar. 24, 2006 Non-Final Office Action.
U.S. Appl. No. 10/222,632, Dec. 8, 2009 Issue Fee payment.
U.S. Appl. No. 10/222,632, Sep. 8, 2009 Notice of Allowance.
U.S. Appl. No. 10/222,632, Jun. 8, 2009 Response to Non-Final Office Action.
U.S. Appl. No. 10/222,632, Dec. 12, 2008 Non-Final Office Action.
U.S. Appl. No. 10/222,632, Nov. 13, 2008 Amendment and Request for Continued Examination (RCE).
U.S. Appl. No. 10/222,632, Jul. 2, 2008 Final Office Action.
U.S. Appl. No. 10/222,632, Mar. 4, 2008 Response to Non-Final Office Action.
U.S. Appl. No. 10/222,632, Oct. 11, 2007 Non-Final Office Action.
U.S. Appl. No. 10/222,632, Aug. 9, 2007 Pre-Brief Appeal Conference Decision.
U.S. Appl. No. 10/222,632, Apr. 26, 2007 Notice of Appeal and Pre-Brief Appeal Conference Request.
U.S. Appl. No. 10/222,632, Feb. 28, 2007 Advisory Action.
U.S. Appl. No. 10/222,632, Feb. 5, 2007 Response to Final Office Action.
U.S. Appl. No. 10/222,632, Oct. 31, 2006 Final Office Action.
U.S. Appl. No. 10/222,632, Aug. 9, 2006 Response to Non-Final Office Action.
U.S. Appl. No. 10/222,632, Mar. 7, 2006 Non-Final Office Action.
U.S. Appl. No. 10/269,694, Aug. 5, 2008 Issue Fee payment.
U.S. Appl. No. 10/269,694, May 5, 2008 Notice of Allowance.
U.S. Appl. No. 10/269,694, Apr. 10, 2008 Supplemental Response to Non-Final Office Action.
U.S. Appl. No. 10/269,694, Jan. 22, 2008 Response to Non-Final Office Action.
U.S. Appl. No. 10/269,694, Sep. 24, 2007 Non-Final Office Action.
U.S. Appl. No. 10/269,694, Jun. 22, 2007 Response to Non-Final Office Action.
U.S. Appl. No. 10/269,694, Feb. 22, 2007 Non-Final Office Action.
U.S. Appl. No. 10/269,694, Nov. 30, 2006 Response to Non-Final Office Action.
U.S. Appl. No. 10/269,694, Jun. 28, 2006 Non-Final Office Action.
U.S. Appl. No. 10/269,718, Sep. 13, 2010 Issue Fee payment.
U.S. Appl. No. 10/269,718, Jun. 14, 2010 Notice of Allowance.
U.S. Appl. No. 10/269,718, Mar. 4, 2010 Response to Non-Final Office Action.
U.S. Appl. No. 10/269,718, Jan. 29, 2010 Non-Final Office Action.
U.S. Appl. No. 10/269,718, Jan. 11, 2010 Amendment and Request for Continued Examination (RCE).
U.S. Appl. No. 10/269,718, Jun. 11, 2009 Notice of Appeal.
U.S. Appl. No. 10/269,718, Dec. 11, 2008 Final Office Action.
U.S. Appl. No. 10/269,718, Aug. 14, 2008 Response to Non-Final Office Action.
U.S. Appl. No. 10/269,718, May 16, 2008 Non-Final Office Action.
U.S. Appl. No. 10/269,718, Apr. 10, 2008 Amendment after Notice of Appeal.
U.S. Appl. No. 10/269,718, Mar. 3, 2008 Pre-Brief Appeal Conference Decision.
U.S. Appl. No. 10/269,718, Feb. 19, 2008 Notice of Appeal and Pre-Brief Conference Request.
U.S. Appl. No. 10/269,718, Nov. 20, 2007 Final Office Action.
U.S. Appl. No. 10/269,718, Sep. 4, 2007 Response to Non-Final Office Action.
U.S. Appl. No. 10/269,718, Jun. 1, 2007 Non-Final Office Action.
U.S. Appl. No. 10/269,718, Mar. 7, 2007 Amendment and Request for Continued Examination (RCE).
U.S. Appl. No. 10/269,718, Sep. 14, 2006 Final Office Action.
U.S. Appl. No. 10/269,718, Jun. 29, 2006 Response to Non-Final Office Action.
U.S. Appl. No. 10/269,718, Feb. 27, 2006 Non-Final Office Action.
U.S. Appl. No. 10/320,259, Feb. 22, 2008 Notice of Abandonment.
U.S. Appl. No. 10/320,259, Aug. 10, 2007 Pre-Brief Appeal Conference Decision.
U.S. Appl. No. 10/320,259, Jul. 2, 2007 Notice of Appeal and Pre-Brief Conference Request.
U.S. Appl. No. 10/320,259, Apr. 2, 2007 Final Office Action.
U.S. Appl. No. 10/320,259, Dec. 22, 2006 Response to Non-Final Office Action.
U.S. Appl. No. 10/320,259, Aug. 22, 2006 Non-Final Office Action.
U.S. Appl. No. 10/352,342, Apr. 10, 2007 Amendment after Notice of Allowance and Issue Fee payment.
U.S. Appl. No. 10/352,342, Jan. 10, 2007 Notice of Allowance.
U.S. Appl. No. 10/352,342, Nov. 13, 2006 Response to Non-Final Office Action.
U.S. Appl. No. 10/352,342, May 12, 2006 Non-Final Office Action.
U.S. Appl. No. 10/352,343, Jul. 2, 2008 Issue Fee payment.
U.S. Appl. No. 10/352,343, May 22, 2008 Notice of Allowance.
U.S. Appl. No. 10/352,343, May 2, 2008 Response to Final Office Action.
U.S. Appl. No. 10/352,343, Mar. 18, 2008 Final Office Action.
U.S. Appl. No. 10/352,343, Dec. 19, 2007 Response to Non-Final Office Action.
U.S. Appl. No. 10/352,343, Jul. 24, 2007 Non-Final Office Action.
U.S. Appl. No. 10/352,343, May 11, 2007 Request for Continued Examination (RCE).
U.S. Appl. No. 10/352,343, Apr. 11, 2007 Advisory Action.
U.S. Appl. No. 10/352,343, Mar. 12, 2007 Response to Final Office Action.
U.S. Appl. No. 10/352,343, Nov. 14, 2006 Final Office Action.
U.S. Appl. No. 10/352,343, Aug. 28, 2006 Response to Non-Final Office Action.
U.S. Appl. No. 10/352,343, Mar. 23, 2006 Non-Final Office Action.
U.S. Appl. No. 10/327,811, Jan. 7, 2010 Notice of Abandonment.
U.S. Appl. No. 10/327,811, Jan. 26, 2009 Final Office Action.
U.S. Appl. No. 10/327,811, Dec. 10, 2008 Response to Non-Final Office Action.
U.S. Appl. No. 10/327,811, Sep. 29, 2008 Non-Final Office Action.
U.S. Appl. No. 10/327,811, Aug. 29, 2008 Amendment and Request for Continued Examination (RCE).
U.S. Appl. No. 10/327,811, Jun. 6, 2008 Pre-Brief Appeal Conference Decision.
U.S. Appl. No. 10/327,811, Mar. 31, 2008 Notice of Appeal and Pre-Brief Conference Request.
U.S. Appl. No. 10/327,811, Nov. 2, 2007 Final Office Action.
U.S. Appl. No. 10/327,811, Oct. 11, 2007 Response to Non-Final Office Action.
U.S. Appl. No. 10/327,811, Jun. 11, 2007 Non-Final Office Action.
U.S. Appl. No. 10/327,811, Apr. 23, 2007 Amendment and Request for Continued Examination (RCE).
U.S. Appl. No. 10/327,811, Dec. 22, 2006 Final Office Action.
U.S. Appl. No. 10/327,811, Sep. 28, 2006 Response to Non-Final Office Action.
U.S. Appl. No. 10/327,811, Apr. 25, 2006 Non-Final Office Action.
U.S. Appl. No. 11/805,946, Jul. 15, 2013 Non-Final Office Action.

(56) References Cited

OTHER PUBLICATIONS

U.S. Appl. No. 11/805,946, Mar. 11, 2011 Amendment and Request for Continued Examination (RCE).
U.S. Appl. No. 11/805,946, Oct. 18, 2010 Final Office Action.
U.S. Appl. No. 11/805,946, Jul. 21, 2010 Response to Non-Final Office Action.
U.S. Appl. No. 11/805,946, Feb. 22, 2010 Non-Final Office Action.
U.S. Appl. No. 11/805,946, Dec. 28, 2009 Terminal Disclaimer Review Decision.
U.S. Appl. No. 11/805,946, Nov. 23, 2009 Response to Non-Final Office Action and Terminal Disclaimer filed.
U.S. Appl. No. 11/805,946, Aug. 28, 2009 Non-Final Office Action.
U.S. Appl. No. 12/022,425, Aug. 20, 2013 Issue Fee payment.
U.S. Appl. No. 12/022,425, May 20, 2013 Notice of allowance.
U.S. Appl. No. 12/022,425, Feb. 20, 2013 Response to Non-Final Office Action.
U.S. Appl. No. 12/022,425, Oct. 30, 2012 Non-Final Office Action.
U.S. Appl. No. 12/022,425, Feb. 24, 2011 Amendment and Request for Continued Examination (RCE).
U.S. Appl. No. 12/022,425, Sep. 1, 2010 Final Office Action.
U.S. Appl. No. 12/022,425, Jun. 15, 2010 Response to Non-Final Office Action.
U.S. Appl. No. 12/022,425, Mar. 11, 2010 Non-Final Office Action.
U.S. Appl. No. 13/573,314, Aug. 15, 2013 Non-Final Office Action.
U.S. Appl. No. 12/633,493, Apr. 10, 2013 Issue Fee payment.
U.S. Appl. No. 12/633,493, Mar. 4, 2013 Notice of Allowance.
U.S. Appl. No. 12/633,493, Dec. 10, 2012 Response to Notice of Allowance.
U.S. Appl. No. 12/633,493, Aug. 16, 2012 Non-Final Office Action.
U.S. Appl. No. 12/633,493, Apr. 11, 2012 Amendment and Request for Continued Examination (RCE).
U.S. Appl. No. 12/633,493, Jan. 19, 2012 Final Office Action.
U.S. Appl. No. 12/633,493, Nov. 29, 2011 Response to Non-Final Office Action.
U.S. Appl. No. 12/633,493, Aug. 1, 2011 Non-Final Office Action.
Y. Singer. "Adaptive Mixtures of Probablistics Transducers", *Neural Computation*, 1977, 9(8): pp. 1711-1734.
Ron, et al., "The Power of Amnesia: Learning Probablistic Automata with Variable Memory Length", *Machine Learning*, 1996, 25: pp. 117-150.
Pereira, et al., "An Efficient Extension to Mixture Techniques for Prediction and Decision Trees", *Machine Learning*, 1999, 36(3): pp. 183-199.
Marceau, "Characterizing the Behavior of a Program Using Multiple-Length N-Grams." *Proceedings of the New Security Paradigms Workshop 2000*, 2000, pp. 101-110.
Lee, et al., "Information-Theoretic Measures for Anomaly Detection." *Proceedings of the 2001 IEEE Symposium on Security and Privacy*, May 2001, pp. 1-17.
Kymie, et al., "'Why 6?' Defining the Operation Limits of stide, an Anomaly-Based Intrusion Detector." *IEEE Symposium on Security and Privacy 2002*, May 12-15, 2002, pp. 188-201.
Eskin, et al., "Protein Family Classification using Sparse Markov Transducers," *Proceedings of the Eighth International Conference on Intelligent Systems for Molecular Biology, AAAI Press*, Menlo Park, CA, 2000.
Kephart, et al., "Automatic Extraction of Computer Virus Signatures," *4th Virus Bulletin International Conference*, pp. 178-184, 1994.
Kohavi, A study of cross-validation and boot-strap for accuracy estimation and model selection, *IJCAI*, 1995.
Rivest, "The MD5 Message Digest Algorithm." *published as Internet RFC 1321*, Apr. 1992. http://www.freesoft.org/CIE/RFC/1321/.
van den Berg and Philip Guenther, "Procmail." online publication, 2001. http://www.procmail.org.
White, et al., "Anatomy of a Commercial-Grade Immune System," *IBM Research White Paper*, 1999.
Zhang, et al., "Intrusion Detection Techniques for Mobile Wireless Networks," *Wireless Networks*, 9(5):545-556 (2003).
Anderson, et al., "Next-Generation Intrusion Detection Expert Systems (NIDES): A Summary," Technical Report SRI-CSL-95-07, *Computer Science Laboratory* (1995).
Lippman, et al., MIT Lincoln Laboratory "*1998 Intrusion Detection Evaluation*" (1998).
Cohen, "Fast Effective Rule Induction," Proceedings of Machine Learning: Proceedings of the Twelfth International Conference (1995).
Lee, A Data Mining Framework for Constructing Features and Models for Intrusion Detection Systems, Ph.D. Thesis, Columbia University (1999).
Honig, et al., (2002) "Adaptive Model Generation: An Architecture for the Deployment of Data Mining-based Intrusion Detection Systems." published in Data Mining for Security Applications, Kluwer.
Burroughs, et al., Apr. 2002, "Analysis of Distributed Intrusion Detection Systems Using Bayesian Methods" presented at IPCCC.
Eskin, et al., (2002), "A geometric framework for unsupervised anomaly detection: Detecting intrusions in unlabeled data." Technical Report, CUCS Technical Report.
Apap, et al., (2001) "Detecting malicious software by monitoring anomalous windows registry accesses." Technical Report, CUCS Technical Report.
Mahoney, et al., (2001) "Detecting novel attacks by identifying anomalous network packet headers." Technical Report CS-2001-2, Florida Institute of Technology, Melbourne, FL.
Portnoy, et al., (2001) "Intrusion detection with unlabeled data using clustering." In *Proceedings of ACM CSS Workshop on Data Mining Applied to Security* (DMSA-2001).
Eskin, et al., (2000) "Anomaly detection over noisy data using learned probability distributions." In *Proceedings of the Seventeenth International Conference on Machine Learning* (ICML-2000).
Lane, et al., (1999) "Temporal sequence learning and data reduction for anomaly detection." *ACM Transactions on Information and System Security*, 2(3):295-331.
Warrender, et al., (1999) "Detecting intrusions using system calls: alternative data models." In *Proceedings of the 1999 IEEE Symposium on Security and Privacy, IEEE Computer Society*, pp. 133-145.
Lee, et al., Aug. 1998, "Mining Audit Data to Build Intrusion Detection Models" In *Proceedings of the Fourth International Conference on Knowledge Discovery and Data Mining* (KDD '98), New York, NY.
Staniford-Chen, et al., Oct. 1998, "The common intrusion detection framework (cidf)." In *Proceedings of the Information Survivability Workshop*.
Lane, et al. (1997) "Sequence Matching and Learning in Anomaly Detection for Computer Security" AAAI Workshop: *AI Approaches to Fraud Detection and Risk Management* pp. 49-49.
Lee, et al., "Learning patterns from UNIX processes execution traces for intrusion detection," In *Proceedings of the AAAI-97 Workshop on AI Approaches to Fraud Detection and Risk Management* pp. 50-56. Menlo Park, CA: AAAI Press. (1997).
Bhattacharya, et al., 2002, "MET: An Experimental System for Malicious Email Tracking", Proceedings 2002 New Security Paradigms Workshop.
Schultz, et al., Jun. 2001, "Mef: Malicious email filter—a UNIX filter that detects malicious windows executable" http://www.cs.columbia.edu/ids/mef/rel_papers.html, USENIX Annual Technical Conference.
Schultz, et al., May 2001, "Data mining methods for detection of new malicious executables" Proceedings of the IEEE Symposium on Security and Privacy.
Wang, et al., 2000, "On computer viral infection and the effect of immunization" *Proceedings of the 16th ACM Annual Computer Applications Conference*.
White, Oct. 1998, "Open problems in computer virus research" Online publication, http://www.research.ibm.com/antivirus/SciPapers/White/Problems, *Virus Bulletin Conference*, pp. 1-11.
Feng, et al., 1994, "Machine Learning of Rules and Trees" *Machine Learning, Neutral and Statistical Classification*, pp. 50-83.
W.O. International, 1993-2003, "PC Viruses in the Wild" http://www.bocklabs.wisc.edu/janda/wildlist.html, pp. 1-15.
Kephart, 1994, "A biologically inspired immune system for computers" *Artificial Life IV, R. Brooks and P. Maes, eds.*, pp. 1-10.

(56) References Cited

OTHER PUBLICATIONS

Bron, et al., "Algorithm 457: Finding All Cliques of an Undirected Graph," *Communications of CACM*, 16:575-577, 1973.

Kephart, et al., "Computer and Epidemiology," *IBM Watson Research Center*, 1993, pp. 1-20.

Denning, "An Intrusion Detection Model" *IEEE Transactions on Software Engineering*, SE-13:118-131, 1986.

Lee, et al., "Mining in a Data-flow Environment: Experience in Network Intrusion Detection" *In Proceedings of the 5th ACM SIGKDD International Conference on Knowledge Discovery & Data Mining (KDD-'99)*, San Diego, CA, Aug. 1999.

Hofmeyr, et al., "Intrusion Detect Using Sequences of System Calls," *Journal of Computer Security*, 6:151-180, 1998.

Friedman, et al., "Efficient Bayesian Parameter Estimation in Large Discrete Domains," *Advances in Neural Information Processing Systems 11*, MIT Press, 1999.

Debar, et al., "Intrusion Detection Exchange Format Data Model," *Internet Engineering Task Force*, Jun. 15, 2000.

Javitz, et al., Mar. 7, 1994, "The NIDES statistical component: Description and justification." *Technical Report, SRI International*.

Eskin, et al., "Adaptive Model Generation for Intrusion Detection Systems" *Workshop on Intrusion Detection and Prevention, 7th ACM Conference on Computer Security*, Athens. Nov. 2000.

Korba, "Windows NT Attacks for the Evaluation of Intrusion Detection Systems", *Massachusetts Institute of Technology*, 102 pages, May 2000.

Campbell, et al., "A modular Approach to Computer Security Risk Management," *AFIPS Conference Proceedings*, AFIPS Press, 1979.

Lindqvist, et al., "How to Systematically Classify Computer Security Intrusions," *Proceedings of the 1997 IEEE Symposium on Research in Security and Privacy*, Oakland, CA, May 1997, pp. 154-163.

Glaseman, et al., "Problem Areas in Computer Security Assessment," *Proceedings of the National Computer Conference*, 1977.

Northcutt, Intrusion Detection: An Analyst's Handbook, New Riders, 1999, pp. 39-40.

Denning, Information Warfare and Security, Addison Wesley, 1999, pp. 23-25, and 385-388.

Bace, Intrusion Detection, Macmillan Technical Publishing, 2000, pp. 156, 237-238.

Amoroso, Intrusion Detection: An Introduction to Internet Surveillance, Correlation, Traps, Trace Back, and Response, Intrusion. Net Books, 1999, pp. 145-167.

Cohen, "Fast Effective Rule Induction," *Machine Learning: the 12th International Conference*, Lake Tahoe, CA, 1995.

Quinlan, J.R., C4.5: Programs for Machine Learning. San Mateo: Morgan Kaufmann, 1993.

T. Mitchell. Machine Learning. McGraw-Hill, 1997, pp. 171-174.

Domingos, "Metacost: A General Method for Making Classifiers Cost-Sensitive," Proceedings of the 5th ACM SIGKDD Internation Conference on Knowledge Discovery & Data Mining (KDD-99), Aug. 1999.

Mohiuddin, et al., Jun. 2002, "Defending Against a large scale Denial-of-Service Attack" *Proceedings of the 2002 IEEE Workshop on Information Assurance and Security*, pp. 30-37.

Gibson, 2001, "The Strange Tale of Denial of Service—Attacks Against grc.com" http://grc.com/dos/grcdos.htm, pp. 1-29.

Houle, Oct. 2001, "Trends in Denial of Service Attack Technology" CERT® Coordination Center. 1.0:1-20.

Taylor, et al., Sep. 2001, "Nate—Network Analysis of Anomalous Traffic Events, a low-cost approach" New Security Paradigms Workshop, pp. 89-96.

Moskowitz, et al., Mar. 2001, "Randomly Roving Agents for Intrusion Detection" Information Technology Division, Naval Research Laboratory, CHACS, pp. 1-16.

Moore, et al., 2001, "Inferring Internet Denial-of-Service Activity" Usenix, pp. 1-14.

Razmov, May 2000, "Denial of Service Attacks and How to Defend Against Them" Computer Science and Engineering Department, University of Washington, pp. 1-7.

Roesch, 1999, "Snort—Lightweight Intrusion Detection for Networks" LISA XIII Systems Conferences, Seattle, WA, pp. 229-238.

Spatscheck, et al., 1999, "Defending Against Denial of Service Attacks in Scout" Proceedings of 3rd USENIX/ACM, pp. 59-72.

Lippmann, et al., 1999, "Results of the DARPA 1998 Offline Intrusion Detection Evaluation" MIT Lincoln Laboratory, pp. 1-29.

Ferguson, et al., 1998, "Network Ingress Filtering: Defeating Denial of Service Attacks which employ IP Source Address Spoofing" Internet Society pp. 1-10.

Perkins, 1996 "Rfc 2002: IP Mobility Support" http://www.facis.org/rfcs/rfc2002.html, pp. 1-74.

Lane, et al., "An Application of Machine Learning to Anomaly Detection," Feb. 14, 1997.

Breunig, et al., "LOF: Identifying Density-Based Local Outliers", *Proc. ACM SICMOD 2000 Int. Conf on Management of Data*, pp. 93-104 (2000).

Cristianini, et al., "An Introduction to Support Vector Machines and Other Kernel-Based Learning Methods", Cambridge University Press, UK, pp. 9-51 (2000).

Leslie, et al., "The Spectrum Kernel: A String Kernel for SVM Protein Classification", *Proceedings of the Pacific Symposium on Biocomputing*, pp. 564-575 (2002).

Cover, et al., "Nearest Neighbor Pattern Classification", *IEEE Transaction on Information Theory*, IT-13(1):21-27 (1967).

Dasgupta, et al., "An Intelligent Decision Support System for Intrusion Detection and response", V.I. Gorodetski et al., (Eds.): MMM-ACNS 2001, LNCS 2052, Springer-Verlag Berling Heidelberg, pp. 1-14 (2001).

Eskin, et al., "Modeling System Calls for Intrusion Detection with Dynamic Window Sizes", *Proceedings of DARPA Information Survivability Conference and Exposition II (DISCEX II)*, Anaheim, CA (2001).

Fan, et al., Ensemble-Based Adaptive Intrusion Detection, *Proceedings of 2002 SIAM International Conference on Data Mining*, Arlington, VA (2002).

Fix, "Discriminatory Analysis: Nonparametric Discrimination: Consistency Properties", *International Statistical Review/Revue Internationale de Statisque*, 57(3):238-247 (1989 (Exhibit B).

Forrest, et al., "A Sense of Self for Unix Processes", *1996 IEEE Symposium on Security and Privacy, IEEE Computer Society Press*, Los Alamitos, CA, pp. 120-128 (1996).

Ghosh, et al., "A Study in Using Neural Networks for Anomaly and Misuse Detection", *Proceedings of the 8th USENIX Security Symposium, Washington*, D.C., Aug. 23-26, 1999, 12 pages.

Hausler, et al,, "Convolution Kernels on Discrete Structures" Technical Report UCSC-CRL-99-10, University of California at Santa Cruz (1999), 38 pages.

Knorr, et al., "Algorithms for Mining Distance-Based Outliers in Large Datasets", *Proc. 24th Int. Conf Very Large Data Bases*, VLDB, pp. 392-403, 24-27 (1998).

Knorr, et al., Finding Intensional Knowledge of Distance-Based Outliers:, *The YLDB Journal*, pp. 211-222 (1999).

Lee, et al., "Data Mining Approaches for Intrusion Detection", *Proceedings of the 1998 USENIX Security Symposium*, 15 pages (1998).

McCallum, et al., "Efficient Clustering of High-Dimensional Data Sets with Application to reference Matching", *Knowledge Discovery and Data Mining*, pp. 169-178 (2000).

Paxson, "Bro: A System for Detecting Network Intruders in Real-Time", *Proceedings of the 7th USENIX Security Symposium*, San Antonio, TX (1998).

Platt, "Fast Training of Support Vector Machines using Sequential minimal Optimization", In B. Scholkopf, C.J.C Burges and A.J. Smola, Editors, Advances in Kernel Methods—support Vector Learning, pp. 185-208, Cambridge, MA (1999) MIT Press.

Provost, et al. "The Case Against Accuracy Estimation for Comparing Induction Algorithms", *Proceedings of the Fifteenth International Conference on Machine Learning* (1998).

Scholkopf, et al., "Estimating the Support of a High-Dimensional Distribution", *Technical Report 99-87, Microsoft Research*, 1999, to appear in Nerual Computation, 2001.

Watkins, et al., "Dynamic Alignment Kernels", *Advances in Large Margin Classifiers*, pp. 39-50, Cambridge, MA 2000, MIT Press.

(56) References Cited

OTHER PUBLICATIONS

Ye, "A Markov Chain Model of Temporal Behavior for Anomaly Detection", *Proceedings of the 2000 IEEE Systems, Man, and Cybernetics Information Assurance and Security Workshop* (2000).
Ye, et al., "Probabilistic Techniques for Intrusion Detection Based on Computer Audit Data", *IEEE Transactions on Systems, Man and Cybernetics—Part A: Systems and Humans*, 31(4):266-274 (2001).
U.S. Appl. No. 60/218,488, filed Jul. 14, 2000.
U.S. Appl. No. 60/244,618, filed Oct. 30, 2000.
U.S. Appl. No. 60/286,963, filed Apr. 30, 2001.
In the United States District Court for the Eastern District of Virginia Richmond Division: Civil Action No. 3:13-cv-808; *The Trustees of Columbia University in the City of New York v. Symantec Corporation*; Defendant Symantec Corporation's Preliminary Invalidity Contentions Pursuant to Paragraph 4 of the Additional Pretrial Order; Certificate of service date May 12, 2014.
Allen et al., "Detecting signs of Intrusion: Distribution Statement A; Approved for Public Release Distribution Unlimited", *Software Engineering Institute, Carnegie Mellon*, 173 pages (Oct. 2000).
Biermann et al., "A comparison of intrusion detection systems", *Computers & Security*, 20(8):676-683 (2001).
Cannady, et al., "A comparative analysis of current intrusion detection technologies", *In Proceedings of the Fourth Conference on Technology for Information Security (ISC '96*, May), 17 pages (1996).
Can, et al., "Sophos anti-virus detection: a technical overview", *Sophos PLC*, 9 pages (Oct. 2002).
Chen, et al., "When virtual is better than real", *The Eighth IEEE workshop on Hot Topics in Operating Systems, HotOS-VIII*, pp. 116-121 (May 2-23, 2001).
Coates, et al., "Virus detection—The Brainy Way", *Virus Bulletin Conference Proceedings*, pp. 211-216 (1995).
CyberCop Monitor Getting Started Guide, Version 2.0 for Windows NT 4.0, 76 pages (1999).
Centrax® Version 3.1 User's Guide, *CyberSafe Corporation*, 173 pages (Jun. 2001).
Damp, "An analysis of the effectiveness of a constructive induction-based virus detection prototype", *Department of the Air Force Air University, Air Force Institute of Technology*, 101 pages (Apr. 2000).
De Vel "Mining E-mail Authorship", *KDD-2000 Workshop on Text Mining*, 7 pages (Aug. 2000).
Doumas, et al., "Design of a neural network for recognition and classification of computer viruses", *Computers & Security*, 14:435-448 (1995).
Gao, et al., "Behavioral distance for intrusion detection", *Lecture Notes in Computer Science 3585, Recent Advances in Intrusion Detection, 8th International Symposium, RAID 2005, Seattle, WA*, Sep. 7-9, 2005 3858:63-81 (2006).
Garfinkel, et al., "When virtual is harder than real: Security challenges in virtual machine based computing environments", HotOS X-Technical Paper, Retrieved on line https://www.usenix.org/legacy/events/hotos05/prelim_papers/garfinkel/garfinkel_html/ 12 pages retrieved on Mar. 5, 2014.
Guinier, "Computer "virus" identification by neural networks: An artificial intelligence connectionist implementation naturally made to work with fuzzy information", *ACM SIGSAC Review*, 9(4):49-59 (1991).
Harmer, "An distributed agent architecture for a computer virus immune system", *Department of the Air Force Air University, Air Force Institute of Technology*, 202 pages (Mar. 2000).
Hollander, "The future of web server security: Why your web site is still vulnerable to attack", *Entercept Security Technologies, Entercept Web Server Edition*, 27 pages (2000) Retrieved on line https://web.archive.org/web/20111216184530/http://clicknet.com/products/entercept/whitepapers/wpfuture.asp.
Hosmer, et al., "Detecting subtle system changes using digital signatures", *IEEE*, pp. 125-128 (1998).
Internet Security Systems, OS Sensor User Guide, 62 pages (Jan. 2001).

Ho, Swee Yenn (George) "Intrusion Detection—Systems for today and tomorrow", SANS Institute, SANS Institute, InfoSec Reading Room, 8 pages (2001).
Jiang, et al., "Virtual playgrounds for worm behavior investigation", *CERIAS Tech Report 2005-24*, 15 pages (2006).
Kephart, et al., "Blueprint for a computer immune system", *Dipankar Dasgupta (Ed.) Artificial Immune Systems and Their Applications*, pp. 242-261, (Oct. 1-3, 1997).
Lamont, et al., "A distributed architecture for a self-adaptive computer virus immune system", *McGraw-Hill Publishing Company, New Ideas in Optimization*, Chapter 11, pp. 167-183, received Dec. 2000.
Lane, et al., "Temporal sequence learning and data reduction for anomaly detection", *AMC Transactions on Information and System Security*, 2(3):295-331 (1999).
LaPadula, "State of the art in anomaly detection and reaction", *MITRE, Center for Integrated Intelligence Systems*, 37 pages (Jul. 1999).
Laureano, et al., "Intrusion detection in virtual machine environments", *Proceedings of the 30th EUROMICRO Conference (EUROMICRO '04)*, pp. 520-525 (2004).
Leitold "Reductions of the general virus detection problem", *Conference Proceedings EICAR International Conference*, pp. 24-30 (2001).
Lindqvist, et al., "eXpert-BSM: A host-based intrusion detection solution for sun solaris", *Proceedings of the 17th Annual Computer Security Applications Conference; IEEE Computer Society*, pp. 240-251 (2001).
McHugh, "Intrusion and intrusion detection", *IJIS*, 1:14-35 (2001).
Mori, "Detecting unknown computer viruses—A new approach—", *ISSS, Lecture Notes in Computer Science*, 3233:226-241, Springer (2003).
Robichaux, "Managing the windows NT Registry, Chapter 8: Administering the Windows NT Registry", O'Reilly & Associates, (1998) retrieved on line http://technet.microsoft.com/en-us/library/cc749939(d=printer).aspx on Mar. 6, 2014.
Sanok, "An analysis of how antivirus methodologies are utilized in protecting computers from malicious code", *Proceeding InfoSecCD '05 Proceedings of the 2nd Annual Conference on Information Security Curriculum Development*, pp. 142-144 (2005).
Schultz, et al., "Data mining methods for detection of new malicious executables", *IEEE*, pp. 38-49 (2001).
Schultz, et al., "Data mining methods for detection of new malicious executables", *Preliminary Program 2001 IEEE Symposium on Security and Privacy*, 13 pages, (May 13-16, 2001).
Sequeira, "Intrusion prevention systems: Security's silver bullet?", *Business Communications Review*, pp. 36-41 (2003).
Shavlik, et al., "Evaluating software sensors for actively profiling windows 2000 computer users", *Presented at the Fourth International Symposium on recent Advances in Intrusion Detection (RAID '01)*, 7 pages (2001).
Szor, "The art of computer virus research and defense", *Symantec Press, Addison Wesley Professional*, 614 pages (2005).
Wang, et al., "Virus detection using data mining techniques", *IEEE*, 71-76 (2003).
Zwienenberg, "Heuristic Scanners: Artificial Intelligence?", Virus Bulletin International Conference, Boston Park Plaza Hotel and Towers, Sep. 20-22, 1995, pp. 203-210.
White, et al., "Anatomy of a commercial-grade immune system", retrieved online http://www.research.ibm.com/antivirus/SciPapers/White/Anatomy/anatomy.html, Venue: Proc. Int'l Virus Bulletin Conf., 29 pages, (1999).
Teasuro, et al., "Neural networks for computer virus recognition", *IEEE Expert*, pp. 5-6 (1996).
"ThunderBYTE Plus MIMESweepr—Firewalls Mail attachments" from David Harley to Firewalls@greatCircle.com and ed@aicpress.com, dated: Jan. 23, 1997, *Great Circle*, retrieved online http://www.greatcircle.com/firewalls/mhonarc/firewalls.199701/msg00670.html, 3 pages, retrieved on Apr. 22, 2014.
ThunderBYTE Anti-Virus Utilities: User Manual, *ESSaSS B. V.*, (TBAV.txt) 172 pages, (1996).
Forrest, et al., "A sense of self for unix processes", *IEEE*, pp. 120-128 (1996).

(56) References Cited

OTHER PUBLICATIONS

Veldman, "Combating viruses heuristically", *Virus Bulletin Conference*, pp. 67-76 (1993).
"How can you protect against viruses?", MIMEsweeper Review: Business Computer World, Dec. 1996, retrieved on line https://web.archive.org/web/19970124231706/http://www.mimesweeper.integralis.com/Pr retrieve on Apr. 21, 2014.
MIMEsweeper SMTP FAQs, (Jan. 24, 1997) retrieved on line https://web.archive.org/web/19970124232123/http://www.mimesweeper.integralis.com/Te retrieved on Apr. 21, 2014.
MIMEsweeper FAQ: Our anti-virus tools scan all executable and files on the desktop. doesn't this make MIMEsweeper unnecessary?, (Jan. 24, 1997) retrieved on line http://web.archive.org/web/19970124232021/http://www.mimesweeper.integralis.com/Pr retrieved on Apr. 21, 2014.
"Combat e-mail viruses and spies", MIMEsweeper Review: PC User, Oct. 1996; retrieved on line http://www.web.archive.org/web/19970124231610/http://www.mimesweeper.integralis.com/Pr retrieved on Apr. 21, 2014.
MIMESweeper—Lexical Analysis: Prevents export of sensitive information, MIMESweeper, (Jan. 24, 1997) retrieved on line https://web.archive.org/web/19970124231116/http://www.mimesweeper.integralis.com/Pr retrieved on Apr. 21, 2014.
"MIMESweeper—Secure computing's editor's choice", MIMEsweeper Review: Secure Computing, Sep. 1996, retrieved on line https://web.arehive.org/web/19970124231653/http://www.mimesweeper.integralis.com/Pr retrieved on Apr. 21, 2014.
MIMESweeper General FAQs: Starting MIMESweeper gives a 1025error, (Jan. 24, 1997) retrieved on line https://web.archive.org/web/19970124232051/http://www.mimesweeper.integralis.com/Te. retrieved on Apr. 21, 2014.
MIMEsweeper—Virus Detection: Support for industry-standard AV tools, retrieved on line https://web.archive.org/web/19970124231045/http://www.mimesweeper.integralis.com/Pr retrieved on Apr. 21, 2014.
MIMESweeper—Supported Email Systems: MIMESweeper can operate with the following email systems, retrieved on line https://web.archive.org/web/19970124231019/http://www.mimesweeper.integralis.com/Pr retrieved on Apr. 21, 2014.
Zenkin, "Anti-virus software reports on windows registry changes", *Computer Fraud & Security*, p. 6 (2000).
Cho, et al., "Two sophisticated techniques to improve HMM-based intrusion detection systems", *LNCS, RAID 2003*, 2825:207-219 (2003).
Smaha, "Haystack: An intrusion detection system", *IEEE*, pp. 37-44 (1988).
Sekar, et al., "A specification-based approach for building survivable systems", *National Information Systems Security Conference*, 10 pages (1998).
Ramakrishnan, et al., "Model-based vulnerability analysis of computer systems", *Proceedings of the 2nd International Workshop on Verification, Model Checking and Abstract Interpretation*, 8 pages (1998).
Kephart, et al., "Automatic extraction of computer virus signatures", *Proceedings of the 4th Virus Bulletin International conference, R. Ford ed., Virus Bulleting Ltd, Abingdon, England*, pp. 179-194 (1994).
Javitz and Valdes, "The NIDES Statistical Component Description and Justification", *Annual Report, A010, Prepared for: Department of the Navy Space and Naval Warfare Systems Command*, 52 pages, (Mar. 7, 1994).
Hochberg, et al., "NADIR: A protype system for detecting network and file system abuse", *Submitted to: information Systems Security, Audit, and Control, Brussels, Belgium*, pp. 1-22 (Nov. 16-18, 1992).
Nachenberg, "Behavior Blocking: The next step in anti-virus protection", *Symantec Connect Community*, last updated Mar. 19, 2002; retrieved on line http://www.symantec.com/connect/articles/behavior-blocking-next-step-anti-virus-protection retrieved on May 11, 2014.
"Applications of Data Mining in Computer Security", edited by Daniel Barbara and Sushil Jajodia, vol. 6 *of Kluwer International Series on advances in Information Security*, 264 pages (2002).
Axelson, "A preliminary attempt to apply detection and estimation theory to intrusion detection", *Department of Computer Engineering Chalmers University of Technology, Goteborg, Sweden*, 11 pages (Mar. 13, 2000).
Lee, et al., "Real time data mining-based intrusion detection", *Proceedings of the 2001 DARPA Information Survivability Conference and Exposition (DISCEX II)*, 13 pages (2001).
ThunderBYTE Anti-Virus Utilities: User Manual, *ESSaSS B.V.*, 364 pages, (1996).
Mukkamala, et al., "Intrusion detection using an ensemble of intelligent paradigms", *Computer Application*, 28:167-182 (2005).
Liang, et al., "Isolated program execution: An application transparent approach for executing untrusted programs", *Proceedings of the 19th annual Computer Security Applications Conference*, 11 pages (2003).
Lee, et al., "A generic virus detection agent on the internet", *Proceedings of the 30th Annual Hawaii International Conference on System Sciences, IEEE*, vol. 4: 10 pages (1997).
Lane, et al., "Approaches to online learning and concept drift for user identification in computer security", *AAAI Technical Report WS-98-07*, pp. 64-70 (1998).
Kruegel, et al., "On the detection of anomalous system call arguments", *Proceedings 8th European Symposium on Research in Computer Security (ESORICS'03)*, pp. 101-118 (2003).
Kolter, et al., "Dynamic weighted majority: A new ensemble method for tracking concept drift", *Proceedings of the Third International IEEE Conference on Data Mining*, pp. 123-130 (2003).
Klinkenberg, et al. "Detecting Concept Drift with support vector machines", *ICML '00 Proceedings of the 17th International Conference on Machine Learning*, pp. 487-494 (2000).
Islam, et al., "A constructive algorithm for training cooperative neural network ensembles", *IEEE Transactions on Neural Networks*, 14(4):820-834 (2003).
Hall, et al., "Comparing pure parallel ensemble creation techniques against bagging", *The Third IEEE International Conference on Data Mining* Nov. 19-22, 2003, 4 pages (2003).
Feng, et al., "Anomaly detection using call stack information", *Proceedings of the 2003 IEEE Symposium on Security and Privacy (SPO '03)*, 14 pages (2003).
Sekar, et al., "A fast automaton-based method for detecting anomalous program behaviors", *Proceedings of the 2001 IEEE Symposium on Security and Privacy*, 12 pages (2001).
Fan, et al., "Ensemble-based adaptive intrusion detection", *SIAM International Conference on Data Mining*, 18 pages (2002).
Dunlap, et al., "ReVirt: Enabling intrusion analysis through virtual-machine logging and replay", *Proceedings of the 2002 Symposium on Operating Systems Design and Implementation*, 14 pages (2002).
"The Digital Immune System: Enterprise-grade anti-virus automation in the 21st century", *Symantec*, 16 pages (2001).
Szor, "Attacks on Win32", *Virus Bulletin Conference*, pp. 57-84 (1998).
Szor, "Attacks on Win32—Part II", *Virus Bulletin Conference*, pp. 47-68 (2000).
"Press Release: Symantec's antivirus research center responds to mutating macro viruses with bloodhound-macro technology", *Symantec Corporation*, (Sep. 1997) retrieved on line http://www.symantec.com/about/news/release/article.jsp?prid=19970923_03 retrieved on Apr. 2, 2014 (4 pages).
"New Release: Symantec's Norton antivirus 4.0 delivers multi-platform support", *Symantec Corporation*, (Sep. 1997) retrieved on line https://www.symantec.com/press/1997/n970923b.html retrieved on Apr. 2, 2014 (3 pages).
Bergeron, et al., "Static detection of malicious code in executable programs", *International Journal of Requirement Engineering*, 8 pages (2001).
Bergeron, et al., "Static analysis of binary code to isolate malicious behaviors", *Proceedings IEEE 8th International Workshops on Enabling Technologies: Infrastructure for Collaborative Enterprises (WET ICE'99)*; Jun. 16-18, 1999; pp. 184-189, (1999).

(56) References Cited

OTHER PUBLICATIONS

"Understanding Heuristics: Symantec's Bloodhound Technology", *Symantec Corporation, Symantec White Paper Series*, vol. XXXIV, 17 pages, (1997).

Kerchen, et al., "Towards a testbed for malicious code detection", *IEEE*, pp. 160-166 (1991).

Burt, "Norton antivirus gold 5.0 review", *The Magazine of the Melbourne PC User Group*, (1999), (3 pages) retrieved on line http://www.melbpc.org.au/pcupdate/9902/9902article2.htm retrieved on Apr. 2, 2014.

"Press Release: Norton antivirus 5.0 deluxe eases online service and support", *Symantec Corporation*, (1998) retrieved on line http://www.symantec.com/about/news/release/article.jsp?prid-19981026_01 retrieved Apr. 2, 2014 (4 pages).

Nachenberg, "Staying ahead of the virus writers: An in-depth look at heuristics", *Virus Bulletin Conference*, pp. 85-98 (1998).

Lo, et al., "MCF: A Malicious Code Filter", *Computers and Security*, 14(6):541-566 (1995) (Work was supported by the US Dept. of Defense May 4, 1994).

Sahami, et al., "A Bayesian approach to filtering junk e-mail", *AAAI Workshop on Learning for Text Categorization*, 8 pages (1998).

Sahami, et al., Bayesian Spam Filter: A Bayesian approach to filtering junk e-mail, *Microsoft*, retrieved on line http://research.microsoft.com/en-us/um/people/horvits/junkfilter.htm, retrieved Apr. 11, 2014 (Abstract).

Arnold, et al., "Automatically generated Win32 heuristic virus detection", *Virus Bulletin Conference*, pp. 51-60 (2000).

Deitrich, "Ensemble Methods in Machine learning", *MCS 2000, LNCS 1857*, pp. 1-15 (2000).

"Multiple Classifier Systems", *Proceedings First International Workshop, MCS 2000, LNCS 1857, Cagliari, Italy*, Jun. 21-23, 2000, 411 pages (2000).

Chan, et al., "Toward parallel and distributed learning by Metalearning", *AAAI Workshop in Knowledge Discovery in Databases*, 14 pages (1993).

Tsymbal, "The problem of concept drift: definitions and related work", Technical Report TCD-CS-2004-15, Department of Computer Science, Trinity College Dublin, Ireland, Apr. 2004 (available at http://www.cs.ted.ie/publications/tech-reports/reports.04/TCD-CS-2004-15.pdf). (7 pages).

Sidiroglou, et al., "Building a reactive immune system for software services", *USENIX Annual Technical Conference*, 149-161 (2005).

Tandon, et al., "Learning rules from system call arguments and sequences for anomaly detection", *Workshop on Data Mining for Computer Security*, (10 pages) (2003).

Didaci, et al., "Ensemble learning for intrusion detection in computer networks", *Proceedings of the 8th Conference of the Italian Association of Artificial Intelligence (AIAA '02)*, (10 pages) (2002).

Chebrolu, et al., "Feature deduction and ensemble design of intrusion detection system", *Computers & Security*, 24:295-307 (2005).

Chaturvedi, et al., "Improving attack detection in host-based IDS by learning properties of system call arguments", *Proceedings of the IEEE Symposium on Security and Privacy*, (19 pages) (2005).

Breiman, "Random forests", *Statistics Department, University of California*, (35 pages) (1999).

Breiman, "Bagging predictors", *Machine Learning*, 24:123-140 (1996).

Bowyer, et al., "A parallel decision tree builder for mining very large visualization datasets", *IEEE International Conference on Systems, Man, and Cybernetics*, (6 pages) (2000).

Bauer, et al., "An empirical comparison of voting classification algorithms: Bagging, boosting, and variants", *Machine Learning*, 36:105-142 (1999).

Viljanen, "A survey of application level intrusion detection", *Department of Computer Science, University of Helsinki, Technical Report, Series of Publications C, Report C-2004-61*, (35 pages) (2004).

Cardinale, et al., "A constructive induction approach to computer immunology", *Thesis Presented to the Faculty of the Graduate School of Engineering of the Air Force Institute Of Technology Air University, Air Education and Training Command*, (243 pages) (1999).

Kephart, et al., "Biologically inspired defenses against computer viruses", *International Conference on Artificial Intelligence*, pp. 985-996 (1995).

Androutsopoulos, et al., "An evaluation of naive Bayesian anti-spam filter", *Proceedings of the workshop on Machine Learning in the New Information Age*, G. Potamias, V. Moustakis and M. van Someren (eds.), *11th European Conference on Machine Learning, Barcelona, Spain*, pp. 9-17 (2000).

Damp, "An analysis of the effectiveness of a constructive induction-based virus detection prototype", *Air Force Inst. Of Tech. Wright-Patterson AFB OH, Accession No.: ADA380616*, Apr. 2000 (Abstract).

Cohen, "Learning tress and rules with set-valued features", *Proceedings of the 13th National Conference on Artificial Intelligence (AAAI-96)*, (9 pages) (1996).

Wilding, "Virus Bulletin: The authoritative international publication on computer virus prevention, recognition and removal", *Virus Bulletin Ltd.*, (20 pages) (1990).

Yeung, et al., "Host-based intrusion detection using dynamic and static behavioral models", *Department of Computer Science Hong Kong University of Science and Technology*, (34 pages) (Nov. 22, 2001).

Ye, "A Markov chain model of temporal behavior for anomaly detection", *Proceedings of the 2000 IEEE Workshop on Information Assurance and Security, US Military Academy*, pp. 171-174 (2000).

Lee, et al., "A data mining framework for constructing features and models for intrusion detection systems", *Doctor of Philosophy in the Graduate School of Arts and Sciences, Columbia University*, (193 pages) (1999).

Valcarce, et al., "ESSENSE: An experiment in knowledge-based security monitoring and control", *UNIX Security Symposium III Proceedings*, (18 pages) (Sep. 14-16, 1992).

Tripwire Intrusion Detection System 1.3 for LINUX User Manual, *Tripwire, Inc.* (46 pages) (Jul. 27, 1998).

Tripwire for Servers 2.4 User Guide, *Tripwire, Inc.*, (101 pages) (2001).

Tripwire 2.4 Reference Guide, *Tripwire, Inc.*, (127 pages) (2001).

Teng, et al., "Adaptive real-time anomaly detection using inductively generated sequential patterns", *IEEE*, pp. 278-284 (1990).

SunSHIELD Basic Security Module (BSM) Guide, *Sun Microsystems*, (239 pages) (2000).

SunSHIELD Basic Security Module (BSM) Guide, *Sun Microsystems*, (195 pages) (1995).

Shavlik, et al., "Evaluating software sensors for actively profiling windows 2000 computer users", *RAID*, (7 pages) (2001).

Schwartzbard, et al., "A study in the feasibility of performing host-based anomaly detection on windows NT", *Proceedings of the 2nd International Workshop on Recent Advances in Intrusion Detection*, (10 pages) (Sep. 7-9, 1999).

Schonlau, et al., "Detecting masquerades in intrusion detection based on unpopular commands", *Information Processing Letters*, 76:33-38 (2000).

Schonlau, et al., "Computer Intrusion: Detecting Masquerades", *Statistical Science*, 16(1):58-74 (2001).

Murray, "Windows NT event logging", *O'Reilly & Associates, Inc.*, (320 pages) (1998).

Masys, et al,, "Protecting clinical data on web client computers: The PCASSO approach", *AMIA, Inc.*, pp. 366-370 (1998).

Mahoney, et al., "Detecting novel attacks by identifying anomalous network packet headers", *Florida Institute of Technology Technical Report CS-2001-2, Department of Computer Sciences Florida Institute of Technology*, (10 pages) (2001).

Lunt, "A survey of intrusion detection techniques", *Computers & Security*, 12:405-418 (1993).

Liao, et al., "Using text categorization techniques for intrusion detection", *Proceedings USENIX Security*, pp. 51-59 (2002).

Li, et al., "Decision tree classifiers for computer intrusion detection", *Parallel and Distributed Computing Practices*, 4(2):179-190 (2001).

(56) References Cited

OTHER PUBLICATIONS

LaPadula, "CyberSecurity Monitoring Tools and Projects: A compendium of commercial and government tools and government research projects", *MITRE Center for Integrated Intelligence Systems* (MP 00B0000018 Reviosn 3), (127 pages) (2000).

Kremer, "Thesis: Real-time intrusion detection for windows NT based on Navy IT-21 audit policy", *Naval Postgraduate School, Monterey, California*, (61 pages) (Sep. 1999).

Korba, "Windows NT attacks for the evaluation of intrusion detection systems", *Massachusetts Institute of Technology*, (102 pages) (2000).

Kim, et al., "Writing, supporting, and evaluating tripwire: A publically available security tool", *Computer Science Technical Reports*, Paper 1122 (25 pages) (1994).

Kim, et al., "The design and implementation of tripwire: A file system integrity checker", *Computer Science Technical Reports*, Paper 1084 (23 pages) (1993).

Kim, et al., "Experiences with tripwire: Using integrity checkers for intrusion detection", *Computer Science Technical Reports*, Paper 1115 (15 pages) (1994).

"Kane Security Analyst Features & Benefits", *Kane Security Analyst*, Intrusion.com, Inc., (2000).

"Intrusion.com Products: Enterprise" retrieved on line https://web.archive.org/web/20010214040305/http://www.intrusion.com/Products/enterprise.shtml, Kane Secure Enterprise, Intrusion.com Inc., (2001).

Intrusion.com Products: Features retrieved on line https://web.archive.org/web/20010215021519/http://www.intrusion.com/Products/kse_features.shtml, Kane Secure Enterprise, Intrusion.com, Inc., (2001).

"Kane Security Detecting Administrator and Super user Misuse", *Kane Secure Enterprise*, Intrusion.com, Inc., (2000).

"Kane Security Detecting Stolen Passwords", *Kane Secure Enterprise*, Intrusion.com, Inc., (2000).

"Advancing the Art of Intrusion Detection: The KSE behavioral profiling system", *Kane Secure Enterprise*, Intrusion.com, Inc., pp. 1-5 (2000).

Hosmer, "Time-lining computer evidence", *IEEE*, pp. 109-112 (1998).

Hoglund, et al., "The "Essense" of intrusion detection: A knowledge-based approach to security monitoring and control", *Proceedings of the 7th International Conference*, Austin, Texas, pp. 201-210 (May 31-Jun. 3, 1994).

Hedbom, et al., "Analysis of the security of windows NT", *Department of Computer Engineering, Chalmers University of Technology*, (97 pages) (1999).

Hedbom, et al., "A security evaluation of a non-distributed version of windows NT", *Proceedings of the 2nd Nordic Workshop on Secure Computer Systems (NORDSEC '97)*, Epoo, Finland, (29 pages) (1997).

Ghosh, et al., "Using program behavior profiles for intrusion detection", *Proceedings of the SANS 3rd Conference on Workshop on Intrusion Detection and Network Monitoring*, (7 pages) (1999).

Ghosh, et al., "Two state-based approaches to program-based anomaly detection", *ACSAC '00 Proceedings of the 16th Annual Computer Security Applications*, pp. 21-30 (2000).

Ghosh, et al., "Learning program behavior profiles for intrusion detection", *Proceedings of the Workshop on Intrusion Detection and network Monitoring*, (13 pages) (Apr. 9-12, 1999).

Ghosh, et al., "Detecting anomalous and unknown intrusions against programs", *Proceedings of the 14th Annual Computer Security Applications Conference, Phoenix, IEEE Computer Society Press*, Los Alamitos, CA, pp. 259-267 (1998).

Friedman, et al., "Efficient Bayesian parameter estimation in large discrete domains", *Advances in Neural Information Processing Systems, MIT Press*, (7 pages) (1999).

Forest, et al., "Self-nonself discrimination in a computer", *Proceedings of 1994 IEEE Symposium on Research in Security and Privacy*, (12 pages) (1994).

Flack, et al., "A toolkit for modeling and compressing audit data", *Purdue University, COAST Laboratory*, (25 pages) (1999).

Hollander, "The future of web server security", *Entercept Security Technologies, Entercept Web Server Edition*, (10 pages) (2001).

Endler, et al., "FOCUS on Intrusion Detection: Intrusion detection using Solaris' basic security module", retrieved on line http://www.securityfocus.com/focus/ids/articles/idsbsm.html, retrieved on Oct. 17, 2000.

Endler, "Intrusion detection applying machine learning to Solaris audit data", *Proceedings of the 1998 Annual Computer Security Application Conference (ACSAC)*, Los Alamitos, CA, pp. 268-279 (1998).

DuMouchel, "Computer intrusion detection based on Bayes factors for comparing command transition probabilities", *National Institute of Statistical Sciences (NISS)*, Technical Report No. 91 (13 pages) (1999).

Du, et al., "Security relevancy analysis on the registry of windows NT 4.0", *Proceedings of the 15th Annual Computer Security Applications Conference (ACSAC '99), IEEE Computer Society*, pp. 331-338 (1999).

Debbabi, et al., "Monitoring of Malicious activity in software systems", *Symposium on Requirements Engineering for Information Security(SREIS)*, (15 pages) (2001).

Dasgupta, "Immunity-based intrusion detection system: a general framework", *Proceedings of 22nd National Information Systems Security Conference*, Arlington, VA, pp. 147-160 (1999).

"A data mining approach for building cost-sensitive and light intrusion detection models—Quarterly Review—Nov. 2000", *North Carolina State University, Columbia University and Florida Institute of Technology*, (90 pages) (2000).

Cohen, "Fast effective rule induction", *Machine Learning: Proceedings of the 12th International Conference*, pp. 115-123 (1995).

Cannady, "An adaptive neural network approach to intrusion detection and response", *School of Computer and Information Sciences Nova Southeastern University*, (181 pages) (2000).

Bell, et al., "Modeling for text compression", *ACM Computing Survey*, 21(4):557-591 (1989).

Barrus, "Intrusion detection in real time in a multi-node, multi-host environment", *Naval Postgraduate School*, (106 pages) (1997).

Bace, "Technology Series: Intrusion detection", *Macmillan Technical Publishing USA*, (365 pages) (2000).

Axelson, "Research in intrusion-detection systems: A survey", *Department of Computer Engineering Chalmers University of Technology*, (93 pages) (Dec. 15, 1998; revised Aug. 19, 1999).

Webb, "Statistical pattern recognition, second edition", *John Wiley & Sons, Ltd.*, (504 pages) (2002).

Webb, "Statistical pattern recognition", *Arnold Publishers and co-published by Oxford university Press Inc.*, (14 pages) (1999).

Mitchell, "Machine learning", *McGraw-Hill Science/Engineering/Math*, (421 pages) (1997).

Langley, "Elements of machine learning", *Morgan Kaufmann Publishers, Inc.*, Chapter 4; Induction of Competitive Concepts, pp. 104-112 (12 pages) (1996).

Hruska, "Computer viruses and anti-virus warfare", *Ellis Horwood Limited*, Chapter 4 (12 pages) (1990).

Prodromidis, et al., "Agent-based distributed learning applied to fraud detection", *Technical Report CUCS-014-99, Columbia University*, (8 pages) (1999).

Buschkes, et al., "How to increase security in mobile networks by anomaly detection", *Proceedings of the 14th Annual computer Security Applications Conference, ACM Special Interest Group on Security, Audit and control*, Phoenix, AZ, (10 pages) (1998).

Lee, et al., "A data mining framework for building intrusion detection models", *Proceedings 1999 IEEE Symposium on Security and Privacy*, pp. 120-132 (1999).

Fan, "Systematic data selection to mine concept-drifting data streams", *ACM, KDD '04*, pp. 128-137 (2004).

MIMESweeper System Requirements, (Jan. 24, 1997) retrieved on line https://web.archive.org/web/19970124231030/http://www.mimesweeper.integralis.com/Pr . . . , retrieved on Apr. 21, 2014.

MIMESweeper FAQ: What email system does MIMESweeper support? (Jan. 24, 1997) retrieved on line https://web.archive.org/web/19970124231813/http://www.mimesweeper.integralis.com/Pr . . . , retrieved on Apr. 21, 2014.

(56) References Cited

OTHER PUBLICATIONS

MIMESweeper FAQ: Can MIMESweeper check internal email?, (Jan. 24, 1997), retrieved on line https://web.archive.org/web/19970124231748/http://www.mimesweeper.integralis.com/Pr . . . , retrieved on Apr. 21, 2014.
MIMESweeper FAQ: What hardware and software do I need to run MIMESweeper?, (Jan. 24, 1997), retrieved on line https://web.archive.org/web/19970124232002/http://www.mimesweeper.integralis.com/Pr . . . , retrieved on Apr. 21, 2014.
MIMESweeper FAQ: What is MIMESweeper and why do I need it? (Jan. 24, 1997), retrieved on line https://web.archive.org/web/19970124231725/http://www.mimesweeper.integralis.com/Pr . . . , retrieved on Apr. 21, 2014.
MIMESweeper FAQ: What platform does MIMEsweeper work on? (Jan. 24, 1997), retrieved on line https://web.archive.org/web/19970124231738/http://www.mimesweeper.integralis.com/Pr . . . , retrieved on Apr. 21, 2014.
MIMESweeper FAQ: Where in my email system would MIMESweeper sit? (Jan. 24, 1997), retrieved on line https://web.archive.org/web/19970124231823/http://www.mimesweeper.integralis.com/Pr . . . , retrieved on Apr. 21, 2014.
MIMESweeper FAQ: Why do I need it if I already have a firewall and desktop products?, (Jan. 24, 1997), retrieved on line https://web.archive.org/web/19970124231758/http://www.mimesweeper.integralis.com/Pr . . . , retrieved on Apr. 21, 2014.
MIMESweeper, Why Windows NT?: Why we built MIMESweeper to run under Windows NT, (Jan. 24, 1997), retrieved on line https://web.archive.org/web/19970124232043/http://www.mimesweeper.integralis.com/Te . . . , retrieved on Apr. 21, 2014.
MIMESweeper: Email message content security, (Jan. 24, 1997), retrieved on line https://web.archive.org/web/19970124231006/http://www.mimesweeper.integralis.com/Pr . . . , retrieved on Apr. 21, 2014.
MIMESweeper: Glossary of terms used in MIMESweeper, (Jan. 24, 1997), retrieved on line https://web.archive.org/web/19970124230731/http://www.mimesweeper.integralis.com/Gl . . . , retrieved on Apr. 21, 2014.
MIMESweeper FAQ: How long does MIMESweeper take to process a message?, (Jan. 24, 1997), retrieved on line https://web.archive.org/web/1997012431858/http://www.mimesweeper.integralis.com/Pr . . . , retrieved on Apr. 21, 2014.
MIMESweeper FAQ: How much administration does MIMESweeper require?, (Jan. 24, 1997), retrieved on line https://web.archive.org/web/19970124232010/http://www.mimesweeper.integralis.com/Pr . . . , retrieved on Apr. 21, 2014.
MIMESweeper: It works with MIMESweeper, (Jan. 24, 1997) retrieved on line https://web.archive.org/web/19970124230641/http://www.mimesweeper.integralis.com/W . . . , retrieved on Apr. 21, 2014.
MIMESweeper cc: Mail FAQs, (Jan. 24, 1997), retrieved on line https://web.archive.org/web/19970124232103/http://www.mimesweeper.integralis.com/Te . . . , retrieved on Apr. 21, 2014.
MIMESweeper: Product Description: Check out the MIMESweeper FAQ, (Jan. 24, 1997), retrieved on line https://web.archive.org/web/19970124230632/http://www.mimesweeper.integralis.com/Pr . . . , retrieved on Apr. 21, 2014.
Virus Bulletin, ISSN 0956-9979 (Entire article, 16 pages) (Aug. 1989).
Virus Bulletin, ISSN 0956-9979 (Entire article, 16 pages) (Jul. 1989).
Virus Bulletin, ISSN 0956-9979 (Entire article, 16 pages) (Sep. 1989).
Virus Bulletin, ISSN 0956-9979 (Entire article, 20 pages) (Oct. 1989).
Virus Bulletin, ISSN 0956-9979 (Entire article, 20 pages) (Nov. 1989).
Virus Bulletin, ISSN 0956-9979 (Entire article, 18 pages) (Dec. 1989).
Virus Bulletin, ISSN 0956-9979 (Entire article, 20 pages) (Feb. 1990).
Virus Bulletin, ISSN 0956-9979 (Entire article, 16 pages) (Mar. 1990).
Virus Bulletin, ISSN 0956-9979 (Entire article, 20 pages) (Apr. 1990).
Virus Bulletin, ISSN 0956-9979 (Entire article, 20 pages) (May 1990).
Virus Bulletin, ISSN 0956-9979 (Entire article, 20 pages) (Jun. 1990).
Virus Bulletin, ISSN 0956-9979 (Entire article, 20 pages) (Jul. 1990).
Virus Bulletin, ISSN 0956-9979 (Entire article, 24 pages) (Aug. 1990).
Virus Bulletin, ISSN 0956-9979 (Entire article, 24 pages) (Sep. 1990).
Virus Bulletin, ISSN 0956-9979 (Entire article, 20 pages) (Oct. 1990).
Virus Bulletin, ISSN 0956-9979 (Entire article, 24 pages) (Nov. 1990).
Virus Bulletin, ISSN 0956-9979 (Entire article, 24 pages) (Dec. 1990).
Virus Bulletin, ISSN 0956-9979 (Entire article, 28 pages) (Jan. 1991).
Virus Bulletin, ISSN 0956-9979 (Entire article, 20 pages) (Feb. 1991).
Virus Bulletin, ISSN 0956-9979 (Entire article, 20 pages) (Mar. 1991).
Virus Bulletin, ISSN 0956-9979 (Entire article, 28 pages) (Apr. 1991).
Virus Bulletin, ISSN 0956-9979 (Entire article, 20 pages) (May 1991).
Virus Bulletin, ISSN 0956-9979 (Entire article, 24 pages) (Jun. 1991).
Virus Bulletin, ISSN 0956-9979 (Entire article, 44 pages) (Jul. 1991).
Virus Bulletin, ISSN 0956-9979 (Entire article, 28 pages) (Aug. 1991).
Virus Bulletin, ISSN 0956-9979 (Entire article, 24 pages) (Sep. 1991).
Virus Bulletin, ISSN 0956-9979 (Entire article, 28 pages) (Oct. 1991).
Virus Bulletin, ISSN 0956-9979 (Entire article, 24 pages) (Nov. 1991).
Virus Bulletin, ISSN 0956-9979 (Entire article, 28 pages) (Dec. 1991).
Virus Bulletin, ISSN 0956-9979 (Entire article, 24 pages) (Jan. 1992).
Virus Bulletin, ISSN 0956-9979 (Entire article, 28 pages) (Feb. 1992).
Virus Bulletin, ISSN 0956-9979 (Entire article, 24 pages) (Mar. 1992).
Virus Bulletin, ISSN 0956-9979 (Entire article, 28 pages) (Apr. 1992).
Virus Bulletin, ISSN 0956-9979 (Entire article, 24 pages) (May 1992).
Virus Bulletin, ISSN 0956-9979 (Entire article, 28 pages) (Jun. 1992).
Virus Bulletin, ISSN 0956-9979 (Entire article, 20 pages) (Jul. 1992).
Virus Bulletin, ISSN 0956-9979 (Entire article, 28 pages) (Aug. 1992).
Virus Bulletin, ISSN 0956-9979 (Entire article, 24 pages) (Sep. 1992).
Virus Bulletin, ISSN 0956-9979 (Entire article, 24 pages) (Oct. 1992).
Virus Bulletin, ISSN 0956-9979 (Entire article, 28 pages) (Nov. 1992).
Virus Bulletin, ISSN 0956-9979 (Entire article, 24 pages) (Dec. 1992).
Virus Bulletin, ISSN 0956-9979 (Entire article, 24 pages) (Jan. 1993).
Virus Bulletin, ISSN 0956-9979 (Entire article, 24 pages) (Feb. 1993).
Virus Bulletin, ISSN 0956-9979 (Entire article, 24 pages) (Mar. 1993).
Virus Bulletin, ISSN 0956-9979 (Entire article, 24 pages) (Apr. 1993).

(56) References Cited

OTHER PUBLICATIONS

Virus Bulletin, ISSN 0956-9979 (Entire article, 24 pages) (May 1993).
Virus Bulletin, ISSN 0956-9979 (Entire article, 24 pages) (Jun. 1993).
Virus Bulletin, ISSN 0956-9979 (Entire article, 24 pages) (Jul. 1993).
Virus Bulletin, ISSN 0956-9979 (Entire article, 24 pages) (Aug. 1993).
Virus Bulletin, ISSN 0956-9979 (Entire article, 24 pages) (Sep. 1993).
Virus Bulletin, ISSN 0956-9979 (Entire article, 20 pages) (Oct. 1993).
Virus Bulletin, ISSN 0956-9979 (Entire article, 24 pages) (Nov. 1993).
Virus Bulletin, ISSN 0956-9979 (Entire article, 24 pages) (Dec. 1993).
Virus Bulletin, ISSN 0956-9979 (Entire article, 24 pages) (Jan. 1994).
Virus Bulletin, ISSN 0956-9979 (Entire article, 24 pages) (Feb. 1994).
Virus Bulletin, ISSN 0956-9979 (Entire article, 24 pages) (Mar. 1994).
Virus Bulletin, ISSN 0956-9979 (Entire article, 24 pages) (Apr. 1994).
Virus Bulletin, ISSN 0956-9979 (Entire article, 24 pages) (May 1994).
Virus Bulletin, ISSN 0956-9979 (Entire article, 24 pages) (Jun. 1994).
Virus Bulletin, ISSN 0956-9979 (Entire article, 24 pages) (Jul. 1994).
Virus Bulletin, ISSN 0956-9979 (Entire article, 24 pages) (Aug. 1994).
Virus Bulletin, ISSN 0956-9979 (Entire article, 24 pages) (Sep. 1994).
Virus Bulletin, ISSN 0956-9979 (Entire article, 24 pages) (Oct. 1994).
Virus Bulletin, ISSN 0956-9979 (Entire article, 24 pages) (Nov. 1994).
Virus Bulletin, ISSN 0956-9979 (Entire article, 24 pages) (Dec. 1994).
Virus Bulletin, ISSN 0956-9979 (Entire article, 24 pages) (Jan. 1995).
Virus Bulletin, ISSN 0956-9979 (Entire article, 24 pages) (Feb. 1995).
Virus Bulletin, ISSN 0956-9979 (Entire article, 24 pages) (Mar. 1995).
Virus Bulletin, ISSN 0956-9979 (Entire article, 24 pages) (Apr. 1995).
Virus Bulletin, ISSN 0956-9979 (Entire article, 24 pages) (May 1995).
Virus Bulletin, ISSN 0956-9979 (Entire article, 24 pages) (Jun. 1995).
Virus Bulletin, ISSN 0956-9979 (Entire article, 24 pages) (Jul. 1995).
Virus Bulletin, ISSN 0956-9979 (Entire article, 24 pages) (Aug. 1995).
Virus Bulletin, ISSN 0956-9979 (Entire article, 24 pages) (Sep. 1995).
Virus Bulletin, ISSN 0956-9979 (Entire article, 24 pages) (Oct. 1995).
Virus Bulletin, ISSN 0956-9979 (Entire article, 24 pages) (Nov. 1995).
Virus Bulletin, ISSN 0956-9979 (Entire article, 24 pages) Dec. 1995).
Virus Bulletin, ISSN 0956-9979 (Entire article, 24 pages) (Jan. 1996).
Virus Bulletin, ISSN 0956-9979 (Entire article, 24 pages) (Feb. 1996).
Virus Bulletin, ISSN 0956-9979 (Entire article, 24 pages) (Mar. 1996).
Virus Bulletin, ISSN 0956-9979 (Entire article, 24 pages) (Apr. 1996).
Virus Bulletin, ISSN 0956-9979 (Entire article, 24 pages) (May 1996).
Virus Bulletin, ISSN 0956-9979 (Entire article, 32 pages) (Jun. 1996).
Virus Bulletin, ISSN 0956-9979 (Entire article, 28 pages) (Jul. 1996).
Virus Bulletin, ISSN 0956-9979 (Entire article, 24 pages) (Aug. 1996).
Virus Bulletin, ISSN 0956-9979 (Entire article, 24 pages) (Sep. 1996).
Virus Bulletin, ISSN 0956-9979 (Entire article, 24 pages) (Oct. 1996).
Virus Bulletin, ISSN 0956-9979 (Entire article, 24 pages) (Nov. 1996).
Virus Bulletin, ISSN 0956-9979 (Entire article, 24 pages) (Dec. 1996).
Virus Bulletin, ISSN 0956-9979 (Entire article, 24 pages) (Jan. 1997).
Virus Bulletin, ISSN 0956-9979 (Entire article, 24 pages) (Feb. 1997).
Virus Bulletin, ISSN 0956-9979 (Entire article, 24 pages) (Mar. 1997).
Virus Bulletin, ISSN 0956-9979 (Entire article, 24 pages) (Apr. 1997).
Virus Bulletin, ISSN 0956-9979 (Entire article, 28 pages) (May 1997).
Virus Bulletin, ISSN 0956-9979 (Entire article, 24 pages) (Jun. 1997).
Virus Bulletin, ISSN 0956-9979 (Entire article, 24 pages) (Jul. 1997).
Virus Bulletin, ISSN 0956-9979 (Entire article, 24 pages) (Aug. 1997).
Virus Bulletin, ISSN 0956-9979 (Entire article, 24 pages) (Sep. 1997).
Virus Bulletin, ISSN 0956-9979 (Entire article, 24 pages) (Oct. 1997).
Virus Bulletin, ISSN 0956-9979 (Entire article, 20 pages) (Nov. 1997).
Virus Bulletin, ISSN 0956-9979 (Entire article, 16 pages) (Dec. 1997).
Virus Bulletin, ISSN 0956-9979 (Entire article, 28 pages) (Jan. 1998).
Virus Bulletin, ISSN 0956-9979 (Entire article, 24 pages) (Feb. 1998).
Virus Bulletin, ISSN 0956-9979 (Entire article, 24 pages) (Mar. 1998).
Virus Bulletin, ISSN 0956-9979 (Entire article, 24 pages) (Apr. 1998).
Virus Bulletin, ISSN 0956-9979 (Entire article, 28 pages) (May 1998).
Virus Bulletin, ISSN 0956-9979 (Entire article, 24 pages) (Jun. 1998).
Virus Bulletin, ISSN 0956-9979 (Entire article, 24 pages) (Jul. 1998).
Virus Bulletin, ISSN 0956-9979 (Entire article, 24 pages) (Aug. 1998).
Virus Bulletin, ISSN 0956-9979 (Entire article, 24 pages) (Sep. 1998).
Virus Bulletin, ISSN 0956-9979 (Entire article, 24 pages) (Oct. 1998).
Virus Bulletin, ISSN 0956-9979 (Entire article, 24 pages) (Nov. 1998).
Virus Bulletin, ISSN 0956-9979 (Entire article, 20 pages) (Dec. 1998).
Virus Bulletin, ISSN 0956-9979 (Entire article, 20 pages) (Jan. 1999).
Virus Bulletin, ISSN 0956-9979 (Entire article, 24 pages) (Feb. 1999).
Virus Bulletin, ISSN 0956-9979 (Entire article, 24 pages) (Mar. 1999).
Virus Bulletin, ISSN 0956-9979 (Entire article, 24 pages) (Apr. 1999).
Virus Bulletin, ISSN 0956-9979 (Entire article, 24 pages) (May 1999).
Virus Bulletin, ISSN 0956-9979 (Entire article, 24 pages) (Jun. 1999).

(56) References Cited

OTHER PUBLICATIONS

Virus Bulletin, ISSN 0956-9979 (Entire article, 24 pages) (Jul. 1999).
Virus Bulletin, ISSN 0956-9979 (Entire article, 24 pages) (Aug. 1999).
Virus Bulletin, ISSN 0956-9979 (Entire article, 24 pages) (Sep. 1999).
Virus Bulletin, ISSN 0956-9979 (Entire article, 24 pages) (Oct. 1999).
Virus Bulletin, ISSN 0956-9979 (Entire article, 24 pages) (Nov. 1999).
Virus Bulletin, ISSN 0956-9979 (Entire article, 24 pages) (Dec. 1999).
Virus Bulletin, ISSN 0956-9979 (Entire article, 24 pages) (Jan. 2000).
Virus Bulletin, ISSN 0956-9979 (Entire article, 24 pages) (Feb. 2000).
Virus Bulletin, ISSN 0956-9979 (Entire article, 24 pages) (Mar. 2000).
Virus Bulletin, ISSN 0956-9979 (Entire article, 24 pages) (Apr. 2000).
Virus Bulletin, ISSN 0956-9979 (Entire article, 24 pages) (May 2000).
Virus Bulletin, ISSN 0956-9979 (Entire article, 24 pages) (Jun. 2000).
Virus Bulletin, ISSN 0956-9979 (Entire article, 24 pages) (Jul. 2000).
Virus Bulletin, ISSN 0956-9979 (Entire article, 24 pages) (Aug. 2000).
Virus Bulletin, ISSN 0956-9979 (Entire article, 24 pages) (Sep. 2000).
Virus Bulletin, ISSN 0956-9979 (Entire article, 24 pages) (Oct. 2000).
Virus Bulletin, ISSN 0956-9979 (Entire article, 24 pages) (Nov. 2000).
Virus Bulletin, ISSN 0956-9979 (Entire article, 24 pages) (Dec. 2000).
Virus Bulletin, ISSN 0956-9979 (Entire article, 24 pages) (Jan. 2001).
Virus Bulletin, ISSN 0956-9979 (Entire article, 24 pages) (Feb. 2001).
Virus Bulletin, ISSN 0956-9979 (Entire article, 24 pages) (Mar. 2001).
Virus Bulletin, ISSN 0956-9979 (Entire article, 24 pages) (Apr. 2001).
Virus Bulletin, ISSN 0956-9979 (Entire article, 24 pages) (May 2001).
Virus Bulletin, ISSN 0956-9979 (Entire article, 24 pages) (Jun. 2001).
Virus Bulletin, ISSN 0956-9979 (Entire article, 24 pages) (Jul. 2001).
Virus Bulletin, ISSN 0956-9979 (Entire article, 24 pages) (Aug. 2001).
Virus Bulletin, ISSN 0956-9979 (Entire article, 24 pages) (Sep. 2001).
Virus Bulletin, ISSN 0956-9979 (Entire article, 24 pages) (Oct. 2001).
Virus Bulletin, ISSN 0956-9979 (Entire article, 24 pages) (Nov. 2001).
Virus Bulletin, ISSN 0956-9979 (Entire article, 24 pages) (Dec. 2001).
Virus Bulletin, ISSN 0956-9979 (Entire article, 24 pages) (Jan. 2002).
Virus Bulletin, ISSN 0956-9979 (Entire article, 24 pages) (Feb. 2002).
Virus Bulletin, ISSN 0956-9979 (Entire article, 24 pages) (Mar. 2002).
Virus Bulletin, ISSN 0956-9979 (Entire article, 24 pages) (Apr. 2002).
Virus Bulletin, ISSN 0956-9979 (Entire article, 24 pages) (May 2002).
Virus Bulletin, ISSN 0956-9979 (Entire article, 24 pages) (Jun. 2002).
Virus Bulletin, ISSN 0956-9979 (Entire article, 24 pages) (Jul. 2002).
Virus Bulletin, ISSN 0956-9979 (Entire article, 24 pages) (Aug. 2002).
Virus Bulletin, ISSN 0956-9979 (Entire article, 24 pages) (Sep. 2002).
Virus Bulletin, ISSN 0956-9979 (Entire article, 24 pages) (Oct. 2002).
Virus Bulletin, ISSN 0956-9979 (Entire article, 24 pages) (Nov. 2002).
Virus Bulletin, ISSN 0956-9979 (Entire article, 24 pages) (Dec. 2002).
Virus Bulletin, ISSN 0956-9979 (Entire article, 24 pages) (Jan. 2003).
Virus Bulletin, ISSN 0956-9979 (Entire article, 24 pages) (Feb. 2003).
Virus Bulletin, ISSN 0956-9979 (Entire article, 24 pages) (Mar. 2003).
Virus Bulletin, ISSN 0956-9979 (Entire article, 24 pages) (Apr. 2003).
Virus Bulletin, ISSN 0956-9979 (Entire article, 24 pages) (May 2003).
Virus Bulletin, ISSN 0956-9979 (Entire article, 24 pages) (Jun. 2003).
Virus Bulletin, ISSN 0956-9979 (Entire article, 24 pages) (Jul. 2003).
Virus Bulletin, ISSN 0956-9979 (Entire article, 24 pages) (Aug. 2003).
Virus Bulletin, ISSN 0956-9979 (Entire article, 24 pages) (Sep. 2003).
Virus Bulletin, ISSN 0956-9979 (Entire article, 24 pages) (Oct. 2003).
Virus Bulletin, ISSN 0956-9979 (Entire article, 24 pages) (Nov. 2003).
Virus Bulletin, ISSN 0956-9979 (Entire article, 24 pages) (Dec. 2003).
Virus Bulletin, ISSN 0956-9979 (Entire article, 24 pages) (Jan. 2004).
Virus Bulletin, ISSN 0956-9979 (Entire article, 24 pages) (Feb. 2004).
Virus Bulletin, ISSN 0956-9979 (Entire article, 24 pages) (Mar. 2004).
Virus Bulletin, ISSN 0956-9979 (Entire article, 24 pages) (Apr. 2004).
Virus Bulletin, ISSN 0956-9979 (Entire article, 24 pages) (May 2004).
Virus Bulletin, ISSN 0956-9979 (Entire article, 24 pages) (Jun. 2004).
Virus Bulletin, ISSN 0956-9979 (Entire article, 24 pages) (Jul. 2004).
Virus Bulletin, ISSN 0956-9979 (Entire article, 24 pages) (Aug. 2004).
Virus Bulletin, ISSN 0956-9979 (Entire article, 24 pages) (Sep. 2004).
Virus Bulletin, ISSN 0956-9979 (Entire article, 24 pages) (Oct. 2004).
Virus Bulletin, ISSN 0956-9979 (Entire article, 24 pages) (Nov. 2004).
Virus Bulletin, ISSN 0956-9979 (Entire article, 24 pages) (Dec. 2004).
Virus Bulletin, ISSN 0956-9979 (Entire article, 24 pages) (Jan. 2005).
Virus Bulletin, ISSN 0956-9979 (Entire article, 24 pages) (Feb. 2005).
Virus Bulletin, ISSN 0956-9979 (Entire article, 24 pages) (Mar. 2005).
Virus Bulletin, ISSN 0956-9979 (Entire article, 24 pages) (Apr. 2005).
Virus Bulletin, ISSN 0956-9979 (Entire article, 24 pages) (May 2005).
Virus Bulletin, ISSN 0956-9979 (Entire article, 24 pages) (Jun. 2005).
Virus Bulletin, ISSN 0956-9979 (Entire article, 24 pages) (Jul. 2005).
Virus Bulletin, ISSN 0956-9979 (Entire article, 24 pages) (Aug. 2005).
Virus Bulletin, ISSN 0956-9979 (Entire article, 24 pages) (Sep. 2005).
Virus Bulletin, ISSN 0956-9979 (Entire article, 24 pages) (Oct. 2005).

* cited by examiner

| Mailref | Sender | Recipient | #Rcpt | #Attach | Size | Date | Interest |
|---|---|---|---|---|---|---|---|
| <CMM.0.90.4.1026923S699.jrk@piran... | jrk@cs.columbia.edu | psi-sys@cs.columbia.edu | 19 | 0 | 6583 | 2002-07-17-12:33:19.0 | Unknown |
| <CMM.0.90.4.1026923S699.jrk@piran... | jrk@cs.columbia.edu | atanas@cs.columbia.edu | 19 | 0 | 6583 | 2002-07-17-12:33:19.0 | Unknown |
| <CMM.0.90.4.1026923S699.jrk@piran... | jrk@cs.columbia.edu | pblaer@cs.columbia.edu | 19 | 0 | 6583 | 2002-07-17-12:33:19.0 | Unknown |
| <CMM.0.90.4.1026923S699.jrk@piran... | jrk@cs.columbia.edu | benko@cs.columbia.edu | 19 | 0 | 6583 | 2002-07-17-12:33:19.0 | Unknown |
| <CMM.0.90.4.1026923S699.jrk@piran... | jrk@cs.columbia.edu | gblasko@cs.columbia.edu | 19 | 0 | 6583 | 2002-07-17-12:33:19.0 | Unknown |
| <CMM.0.90.4.1026923S699.jrk@piran... | jrk@cs.columbia.edu | lok@cs.columbia.edu | 19 | 0 | 6583 | 2002-07-17-12:33:19.0 | Unknown |
| <CMM.0.90.4.1026923S699.jrk@piran... | jrk@cs.columbia.edu | pablo@cs.columbia.edu | 19 | 0 | 6583 | 2002-07-17-12:33:19.0 | Unknown |
| <CMM.0.90.4.1026923S699.jrk@piran... | jrk@cs.columbia.edu | heller@cs.columbia.edu | 19 | 0 | 6583 | 2002-07-17-12:33:19.0 | Unknown |
| <CMM.0.90.4.1026923S699.jrk@piran... | jrk@cs.columbia.edu | shlomo@cs.columbia.edu | 19 | 0 | 6583 | 2002-07-17-12:33:19.0 | Unknown |
| <CMM.0.90.4.1026923S699.jrk@piran... | jrk@cs.columbia.edu | sashabg@cs.columbia.edu | 19 | 0 | 6583 | 2002-07-17-12:33:19.0 | Unknown |
| <CMM.0.90.4.1026923S699.jrk@piran... | jrk@cs.columbia.edu | mstar@cs.columbia.edu | 19 | 0 | 6583 | 2002-07-17-12:33:19.0 | Unknown |
| <CMM.0.90.4.1026923S699.jrk@piran... | jrk@cs.columbia.edu | ab16@columbia.edu | 19 | 0 | 6583 | 2002-07-17-12:33:19.0 | Unknown |
| <CMM.0.90.4.1026923S699.jrk@piran... | jrk@cs.columbia.edu | an4@columbia.edu | 19 | 0 | 6583 | 2002-07-17-12:33:19.0 | Unknown |
| <CMM.0.90.4.1026923S699.jrk@piran... | jrk@cs.columbia.edu | ms10760columbia.edu | 19 | 0 | 6583 | 2002-07-17-12:33:19.0 | Unknown |
| <CMM.0.90.4.1026923S699.jrk@piran... | jrk@cs.columbia.edu | mo2@columbia.edu | 19 | 0 | 6583 | 2002-07-17-12:33:19.0 | Unknown |
| <CMM.0.90.4.1026923S699.jrk@piran... | jrk@cs.columbia.edu | dp2029@columbia.edu | 19 | 0 | 6583 | 2002-07-17-12:33:19.0 | Unknown |

FIG. 2A

| | | | | | | |
|---|---|---|---|---|---|---|
| <CMM.0.90.4.1026923S699.jrk@piran... | jrk@cs.columbia.edu | allen@cs.columbia.edu | 19 | 0 | 6583 | 2002-07-17-12:33:19.0 | Unknown |
| <CMM.0.90.4.1026923S699.jrk@piran... | jrk@cs.columbia.edu | hgs@cs.columbia.edu | 19 | 0 | 6583 | 2002-07-17-12:33:19.0 | Not Interesting |
| <CMM.0.90.4.1026923S699.jrk@piran... | jrk@cs.columbia.edu | jeff@cs.columbia.edu | 19 | 0 | 6583 | 2002-07-17-12:33:19.0 | Unknown |
| <CMM.0.90.4.1026923S699.jrk@piran... | jrk@cs.columbia.edu | psi-sys@cs.columbia.edu | 19 | 0 | 6583 | 2002-07-17-12:33:19.0 | Unknown |
| <CMM.0.90.4.1026923S699.jrk@piran... | jrk@cs.columbia.edu | dianas@cs.columbia.edu | 19 | 0 | 6583 | 2002-07-17-12:33:19.0 | Unknown |
| <CMM.0.90.4.1026923S699.jrk@piran... | jrk@cs.columbia.edu | pblaer@cs.columbia.edu | 19 | 0 | 6583 | 2002-07-17-12:33:19.0 | Unknown |
| <CMM.0.90.4.1026923S699.jrk@piran... | jrk@cs.columbia.edu | benko@cs.columbia.edu | 19 | 0 | 6583 | 2002-07-17-12:33:19.0 | |
| <CMM.0.90.4.1026923S699.jrk@piran... | jrk@cs.columbia.edu | gblasko@cs.columbia.edu | 19 | 0 | 6583 | 2002-07-17-12:33:19.0 | Unknown |
| <CMM.0.90.4.1026923S699.jrk@piran... | jrk@cs.columbia.edu | lok@cs.columbia.edu | 19 | 0 | 6583 | 2002-07-17-12:33:19.0 | |
| <CMM.0.90.4.1026923S699.jrk@piran... | jrk@cs.columbia.edu | pablo@cs.columbia.edu | 19 | 0 | 6583 | 2002-07-17-12:33:19.0 | Unknown |
| <CMM.0.90.4.1026923S699.jrk@piran... | jrk@cs.columbia.edu | heller@cs.columbia.edu | 19 | 0 | 6583 | 2002-07-17-12:33:19.0 | |
| <CMM.0.90.4.1026923S699.jrk@piran... | jrk@cs.columbia.edu | shlomo@cs.columbia.edu | 19 | 0 | 6583 | 2002-07-17-12:33:19.0 | Unknown |
| <CMM.0.90.4.1026923S699.jrk@piran... | jrk@cs.columbia.edu | sashaby@cs.columbia.edu | 19 | 0 | 6583 | 2002-07-17-12:33:19.0 | Unknown |
| <CMM.0.90.4.1026923S699.jrk@piran... | jrk@cs.columbia.edu | mstar@cs.columbia.edu | 19 | 0 | 6583 | 2002-07-17-12:33:19.0 | Unknown |
| <CMM.0.90.4.1026923S699.jrk@piran... | jrk@cs.columbia.edu | ab16@columbia.edu | 19 | 0 | 6583 | 2002-07-17-12:33:19.0 | Unknown |
| <CMM.0.90.4.1026923S699.jrk@piran... | jrk@cs.columbia.edu | an4@columbia.edu | 19 | 0 | 6583 | 2002-07-17-12:33:19.0 | Unknown |
| <CMM.0.90.4.1026923S699.jrk@piran... | jrk@cs.columbia.edu | ms1076@columbia.edu | 19 | 0 | 6583 | 2002-07-17-12:33:19.0 | Unknown |
| <CMM.0.90.4.1026923S699.jrk@piran... | jrk@cs.columbia.edu | mo2@columbia.edu | 19 | 0 | 6583 | 2002-07-17-12:33:19.0 | Unknown |
| <CMM.0.90.4.1026923S699.jrk@piran... | jrk@cs.columbia.edu | dp2029@columbia.edu | 19 | 0 | 6583 | 2002-07-17-12:33:19.0 | Unknown |
| <ah3p56r-dun0@eGroups.com> | chezlscorner@yahoo.com | ChezisCorner@yahoogroups.com | 1 | 0 | 10586 | 2002-07-17-12:49:42.0 | Not Interesting |
| <20020717171701.q6HH1tRu013871... | genevieve@cs.columbia.edu | phd-students@cs.columbia.edu | 2 | 0 | 685 | 2002-07-17-13:01:55.0 | Not Interesting |
| <20020717171701.q6HH1tRu013871... | genevieve@cs.columbia.edu | lerner@cs.columbia.edu | 2 | 0 | 685 | 2002-07-17-13:01:55.0 | Not Interesting |
| <20020717171733.q6HHXq1w019684... | Kathy@cs.columbia.edu | jrk@cs.columbia.edu | 30 | 0 | 538 | 2002-07-17-13:33:42.0 | Not Interesting |
| <20020717171733.q6HHXq1w019684... | Kathy@cs.columbia.edu | allen@cs.columbia.edu | 30 | 0 | 538 | 2002-07-17-13:33:42.0 | Unknown |

FIG. 2B

☐ Flag rplyto
☐ Flag forward
☑ Email MIME type — text/plain
☑ Number of RE in subject — 1
☐ Email Subject Line
☑ Time adjustment to std time — 0400
☐ Unix time representation
☐ Sender Location (internal/external)
☐ rcpt Location (internal/external)
☐ Date Time Select All | Unselect All | Clear | Save Changes Last Refresh at Thu Aug 16 13:00:57 EDT 2002

FIG. 3B

SYSTEM AND METHODS FOR DETECTING MALICIOUS EMAIL TRANSMISSION

CLAIM FOR PRIORITY TO RELATED APPLICATIONS

This application claims priority from and is a continuation of U.S. patent application Ser. No. 12/633,493 filed on Dec. 8, 2009 entitled "System and Methods for Detecting Malicious Email Transmission," which itself claims priority from and is a continuation of U.S. patent application Ser. No. 10/222,632 filed on Aug. 16, 2002 entitled "System and Methods for Detecting Malicious Email Transmission," now U.S. Pat. No. 7,657,935, which itself claims the benefit of U.S. Provisional Patent Application Ser. No. 60/340,197, filed on Dec. 14, 2001, entitled "System for Monitoring and Tracking the Spread of Malicious E-mails," and U.S. Provisional Patent Application Ser. No. 60/312,703, filed Aug. 16, 2001, entitled "Data Mining-Based Intrusion Detection System," which are hereby incorporated by reference in their entirety herein.

STATEMENT OF GOVERNMENT RIGHT

The present invention was made in part with support from United States Defense Advanced Research Projects Agency (DARPA), grant no. F30602-00-1-0603. Accordingly, the United States Government may have certain rights to this invention.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods for detecting violations of an email security policy in a computer system, and more particularly to the use of probabilistic and statistical models to model the behavior of email transmission through the computer system.

2. Background

Computer systems are constantly under attack by a number of malicious intrusions. For example, malicious software is frequently attached to email. According to NUA Research, email is responsible for the spread of 80 percent of computer virus infections (Postini Corporation, Press release "Postini and Trend Micro Partner to Offer Leading Virus Protection Via Postini's Email Pre-processing Infrastructure," Online Publication, 2000. http://www.postini.com/company/pr/pr100200.html.) Various estimates place the cost of damage to computer systems by malicious email attachments in the range of 10-15 billion dollars in a single year. Many commercial systems have been developed in an attempt to detect and prevent these attacks. The most popular approach to defend against malicious software is through anti-virus scanners such as Symantec and McAfee, as well as server-based filters that filters email with executable attachments or embedded macros in documents (Symantec Corporation, 20330 Stevens Creek Boulevard, Cupertino, Calif. 95014, Symantec worldwide home page, Online Publication, 2002. http://www.symantec.com/product, and McAfee.com Corporation, 535 Oakmead Parkway, Sunnyvale, Calif. 94085, Macafee home page. Online Publication, 2002. http://www.mcafee.com).

These approaches have been successful in protecting computers against known malicious programs by employing signature-based methods. However, they do not provide a means of protecting against newly launched (unknown) viruses, nor do they assist in providing information that my help trace those individuals responsible for creating viruses. Only recently have there been approaches to detect new or unknown malicious software by analyzing the payload of an attachment. The methods used include heuristics, (as described in Steve R. White, "Open problems in computer virus research," Online publication, http://www.research.ibm.com/antivirus/SciPapers/White/Problems/Problems.html), neural networks (as described in Jeffrey O. Kephart, "A biologically inspired immune system for computers," *Artificial Life IV, Proceedings of the Fourth International Workshop on Synthesis and Simulation of Living Systems*, Rodney A. Brooks and Pattie Maes, eds. pages 130-193, 1994), and data mining techniques (as described in Matthew G. Schultz, Eleazar Eskin, Erez Zadok, and Salvatore J. Stolfo, "Data Mining Methods For Detection Of New Malicious Executables," *Proceedings of the IEEE Symposium on Security and Privacy*, Oakland, Calif., May 2001, and Salvator J. Stolfo, Erez Zadok, Manasi Bhattacharyya, Matthew G. Schultz, and Eleazar Eskin "MEF: Malicious Email Filter: a Unix Mail Filter That Detects Malicious Windows Executables," Online publications, http://www.cs.columbia.edu/ids/mef/rel papers.html). An email filter which detects malicious executables is described in Schultz et al. U.S. patent application Ser. No. 10/208,432, filed Jul. 30, 2002, entitled "System and Methods for Detection of New Malicious Executables," which is incorporated by reference in its entirety herein.

In recent years however, not only have computer viruses increased dramatically in number and begun to appear in new and more complex forms, but the increased inter-connectivity of computers has exacerbated the problem by providing the means of fast viral propagation.

Moreover, violations in email security policies have occurred which are marked by unusual behaviors of emails or attachments. For example, spam is a major concern on the internet. More than simply an annoyance, it costs corporations many millions of dollars in revenue because spam consumes enormous bandwidth and mail server resources. Spam is typically not detected by methods that detect malicious attachments, as described above, because spam typically does not include attachments.

Other email security violations may occur where confidential information is being transmitted by an email account to at least one improper addressee. As with spam, such activity is difficult to detect where no known viruses are attached to such emails.

Accordingly, there exists a need in the art for a technique to detect violations in email security policies which can detect unauthorized uses of email on a computer system and halt or limit the spread of such unauthorized uses.

SUMMARY

An object of the present invention is to provide a technique for detecting violations of email security policies of a computer system by gathering statistics about email transmission through a computer system.

Another object of the present invention is to provide a technique for modeling the behavior of attachments and/or modeling of the behavior of email accounts on a computer system.

A further object of the present invention is to provide a technique for generating and comparing profiles of normal or baseline email behavior for an email account and for selected email behavior and for determining the difference between such profiles, and whether such difference represents a violation of email security policy.

A still further object of the invention is to protect the identity of email account users, while tracking email behavior associated with such users.

These and other objects of the invention, which will become apparent with reference to the disclosure herein, are accomplished by a system and methods for detecting an occurrence of a violation of an email security policy of a computer system by transmission of selected email through the computer system. The computer system may comprise a server and one or more clients having an email account. The method comprises the step of defining a model relating to prior transmission of email through the computer system derived from statistics relating to the prior emails, and the model is saved in a database. The model may be probabilistic or statistical. Statistics may be gathered relating to the transmission of the selected email through the computer system. The selected email may be subsequently classified as violative of the email security policy based on applying the model to the statistics.

In a preferred embodiment, the step of defining a model comprises defining a model relating to attachments to the prior emails transmitted through the computer system. Such model may created by using a Naive Bayes model trained on features of the attachment. New attachments are extracted from each of the new emails transmitted through the computer system. The attachment may be identified with a unique identifier. According to this embodiment, the step of gathering statistics relating to the transmission of new email through the computer system comprises recording the number of occurrences of the attachment received by the client.

The step of gathering statistics relating to the transmission of new email through the computer system may comprise, for each attachment that is transmitted by an email account, recording a total number of addresses to which the attachment is transmitted. This step may also include recording a total number of email accounts which transmit the attachment. In addition, this step may include, for each attachment that is transmitted by an email account, defining a model that estimates the probability that an attachment violates an email security policy based on the total number of email addresses to which the attachment is transmitted and the total number of email accounts which transmit the attachment.

The step of classifying the email may be performed at the client. Alternatively or in addition, the step of classifying the email may be performed at the server. The classification determined at the server may be transmitted to the one or more clients. In addition, the classification determined at the client may be transmitted to the server, and retransmitted to the one or more clients in the system.

According to another embodiment, the step of defining a model relating to prior transmission of email may comprise defining model derived from statistics relating to transmission of emails from one of the email accounts. A model may be derived from statistics accumulated over a predetermined time period. For example, a model may be defined relating the number of emails sent by an email account during a predetermined time period. A model may alternatively be derived from statistics accumulated irrespective of a time period. For example, a model may be derived relating to the number of email recipients to which the email account transmits an email. In an exemplary embodiment, such models are represented as histograms. The step of gathering statistics about the transmission of selected email may comprise representing such transmission of selected email as a histogram. Classifying the transmission of selected email may comprise comparing the histogram of prior email transmission with the histogram of selected email transmission. The comparison may be performed by such techniques as Mahalonobis distance, the Chi-Square test, or the Kolmogorov-Simironov test, for example.

Advantageously, the step of defining a model relating to transmission of emails from one of the email accounts may comprise defining the model based on the email addresses of recipients to which the emails are transmitted by the email account. Accordingly, the email addresses may be grouped into cliques corresponding to email addresses of recipients historically occurring in the same email. The step of gathering statistics relating to the transmission of email through the computer system may comprise, for email transmitted by the email account, gathering information on the email addresses of the recipients in each email. The email may be classified as violating the email security policy based on whether the email addresses in the email are members of more than one clique.

The step of defining a model relating to transmission of emails from one of the email accounts may comprise, for emails transmitted from the email account, defining the model based on the time in which the emails are transmitted by the email account. Alternatively, the model may be based on the size of the emails that are transmitted by the email account. As yet another alternative, the model may be based on the number of attachments that are transmitted by the email account The client may comprise a plurality of email accounts and the step of defining a model relating to prior transmission of email may comprise defining a model relating to statistics concerning emails transmitted by the plurality of email accounts. According to this embodiment, the step of defining a probabilistic model may comprise defining a model based on the number of emails transmitted by each of the email accounts. The model may also be defined based on the number of recipients in each email transmitted by each of the email accounts.

In accordance with the invention, the objects as described above have been met, and the need in the art for a technique which detects violations in an email security policy by modeling the email transmission through the computer system, has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which:

FIGS. 2A-2C (collectively "FIG. 2" herein) depict a screen of the user interface, illustrating information displayed concerning emails transmitted through the system in accordance with the present invention.

FIGS. 3A-3B (collectively "FIG. 3" herein) depict another screen of the user interface, illustrating further information displayed concerning emails transmitted through the system in accordance with the present invention.

Figure 1:
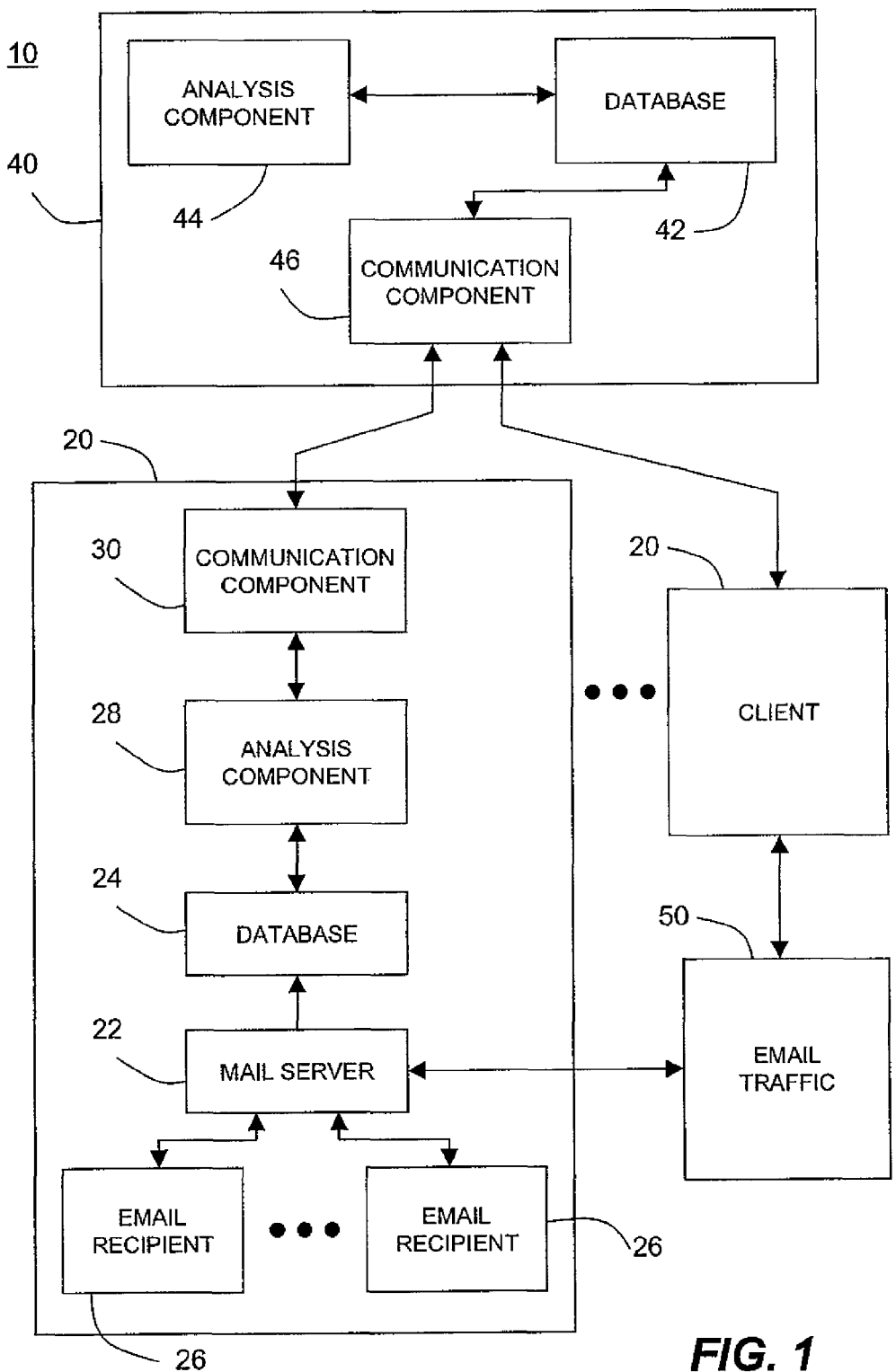
FIG. 1 is a chart illustrating a system in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

This invention will be further understood in view of the following detailed description.

In accordance with the invention, a system and method for a violation of an email security policy of a computer system is disclosed herein. A violation of an email security policy can be defined in several ways. Such an email security policy may be explicit or implicit, and generally refers to any activity which may be harmful to the computer system. For example, an attachment to an email which contains a virus may be considered a violation of a security policy. Attachments which contain viruses can manifest themselves in several ways, for example, by propagating and retransmitting themselves. Another violation of a security policy may be the act of emailing attachments to addresses who do not have a need to receive such attachments in the ordinary course. Alternatively, the security policy may be violated by "spam" mail, which are typically unsolicited emails that are sent to a large number of email accounts, often by accessing an address book of a host email account. The method disclosed herein detects and tracks such security violations in order to contain them.

A model is defined which models the transmission of prior email through the computer system through the computer system. The model may be statistical model or a probabilistic model. The transmission of emails "through" the system refers to emails transmitted to email accounts in the system, email transmitted by email accounts in the system, and between email accounts within the system. The system accumulates statistics relating to various aspects of email traffic flow through the computer system. According to one embodiment, the model is derived from observing the behavior or features of attachments to emails. Another embodiment concerns modeling the behavior of a particular email account. Yet another embodiment models the behavior of the several email accounts on the system to detect "bad" profiles. The model is stored on a database, which may be either at a client or at a server, or at both locations.

The selected email transmission is typically chosen for some recent time period to compare with the prior transmission of email. Each email and/or its respective attachment is identified with a unique identifier so it may be tracked through the system. Various statistics relating to the emails are gathered. The probability that some aspect of the email transmission, e.g. an attachment, an email transmission, is violative of an email security policy is estimated by applying the model based on the statistics that have been gathered. Whether the email transmission is classified as violative of the email security policy is then transmitted to the other clients.

The system 10, as illustrated in FIG. 1, has two primary components, one or more clients 20 and one or more servers 40. The client 20 is defined herein as a program integrated with an email server 22, which monitors and logs email traffic 50 for one or more email accounts 26, and which generates reports that are sent to the server 40. The client 20 may run on a separate computer from the email server 22, or on the same computer. The server 40 may run at a central location and receives reports from the client 20 in order to generate statistics and alerts about violations of email security policy which are distributed back to the clients 20.

The client 20 also includes a database 24, which stores information about all email attachments that pass through the mail server 22 to one or more email accounts 26. (Transmission of the email to the respective account may be prevented if a violation of a security policy is detected.) The system 10 contains a component to integrate with the email sever 22. In an exemplary embodiment, the client 20 is integrated with SENDMAIL using PROCMAIL. The client 20 also contains an analysis component 28 to compute the unique identifiers for attachments. The data analysis component 28 extracts statistics from the database 24 to report to the server 40. A communication component 30 handles the communication between the client 20 and the server 40.

When integrated with the mail server 22, the client 20 processes all email. Each email is logged in the database 24 along with a set of properties associated with that email including a unique reference number for that email, the sending email account, the recipient email accounts, the number of recipients, the number of attachments, if any, the time and date of the email, the size in bytes of the email body, the size in bytes of the subject line, the number and list of "keywords" in the email subject line or body, other linguistic features of the email content (which may be a wide variety of features such as the number of nouns, or noun phrases, and/or the frequency distribution of words, or the frequency distribution of n-grams, or other such linguistic features commonly known in the state of the art), as well as other recorded properties of the email (some that may be inferred by application of a probabilistic, statistical or classification model which may label the email with some category of interest).

The mail server 22 extracts attachments from the email, if any, and computes a unique identifier for each attachment. The name of the attachment or the subject of the email is typically not sufficient information for tracking because one virus may be sent under several different names and subject lines since these fields are easily alterable by the malicious software. The system computes the MD5 hash of every binary attachment received to create the unique identifier, using the hexadecimal representation of the binary as input to the algorithm. (The MD5 is known in the art, and described in R.

Rivest, "The MD5 Message Digest Algorithm," *Internet RFC*1321, Paril 1992, which is incorporated by reference in its entirety herein.) (Polymorphic viruses will have different identifiers for each instance of the virus.) A probabilistic model for the attachments may be created by training a Naive Bayes model on a training set of email attachments, described in U.S. patent application Ser. No. 10/208,432, filed Jul. 30, 2002, entitled "System and Methods for Detection of New Malicious Executables," which is incorporated by reference above.

This unique identifier is used to aggregate information about the same attachment propagated in different emails. This step if most effective if payload, e.g., the content of the email, such as the body, the subject, and/or the content of the attachment, is replicated without change during virus propagation among spreading emails and thus tracking the email attachments via this identifier is possible.

The client 20 stores a record containing the identifier and other information and statistics for each email and attachment in the database 24. This information is typically transmitted to the server 40, and such information is also transmitted from the server 40 to the client 20 for information that is received from other clients 20, or where identifiers or models have been updated. By querying the database 24 with a list of the identifiers for known programs that are "malicious," e.g., that violate the security policy, the administrator can determine the points of entry of emails having such programs as attachments into a network, and can maintain a list of the senders and recipients of these emails. Even if a logged attachment was not initially acknowledged as malicious but only later categorized to be so, since a record of all attachments is stored in the database the points of entry can still be recovered.

System 10 allows the system administrator to distinguish between email traffic containing non-malicious email attachments and email traffic containing malicious software attachments. Malicious programs that self-replicate will likely propagate at a significantly different rate than regular attachments sent within the environment in which the system 10 is installed. These differences may become more apparent as all email is monitored, and (temporal) statistics are gathered carefully within that environment to establish norms for email flows, as will be described below.

The system 10 uses the information stored in the database in several ways. Since the system 10 can determine the points of entry of a malicious attachment into a network, e.g., the recipient email account 26 and/or the client 20 associated with the email account 26, this can greatly assist the cleanup associated with an email virus incident and can help the system administrator reduce and contain the associated damage.

In addition, the client 20 gathers statistics about the propagation of each malicious attachment through the site which is shared with the server 40. The system may define an attachment as malicious or benign by extracting features of the attachment, and using a probabilistic model to determine whether the attachment is malicious or benign. A procedure for classifying attachments is described in U.S. patent application Ser. No. 10/208,432, filed Jul. 30, 2002, entitled "System and Methods for Detection of New Malicious Executables," which is incorporated by reference above.

The system also may define a probabilistic or statistical model relating to the behavior of attachments derived from these statistics or features. This allows a global view of the propagation of malicious attachments and allows the system 10 to quantify the threat of these attachments as described below. Some statistics that are reported for each malicious attachment is the prevalence of an attachment and the birth rate of an attachment. The prevalence is the number of occurrences an attachment was observed by the client 20 and the birth rate is the average number of copies of the attachment which are transmitted from the same email account 26. Both of these statistics can be easily obtained from the database 24.

Self-replicating viruses naturally have extremely high birth rates. If a client 20 detects an attachment with a very high birth rate, the client 20 can warn the server 40 that this attachment is a potential self replicating virus. The server 40 can in turn warn other clients 20 about this attachment which can reduce the spread of these types of viruses.

Many self-replicating viruses have a similar method of propagation, i.e., they transmit themselves to email addresses found on the address book of the host computer. This behavior may manifest itself in an extremely high birth rate for the attachment. While in some cases a large birthrate for an attachment would be normal, such as in a broadcast message, self-replicating viruses are characterized in that the message is transmitted from multiple email accounts 26. In fact, the number of email accounts 26 that send the message depends on the number of email accounts 26 that open the attachment.

An exemplary method for detecting self-replicating viruses is to classify an attachment as self replicating if its birth rate is greater than some threshold t and the attachment is sent from at least l email accounts. If an email flow record is above the threshold t, the client 20 notifies the server 40 with the unique identifier of the attachment. The server 40 propagates the unique identifier to the clients 20 which instruct the mail server 24 to block all emails that contain an attachment with this unique identifier. In practice, these mails can be queued until a system administrator can determine whether or not they are malicious.

The server 40 runs at a central location and communicates with the clients 20 deployed at various mail servers 22. The server 40 can typically be operated by a trusted third party and various networks can make agreements with this third party to provide the services described herein.

Figure 2C:
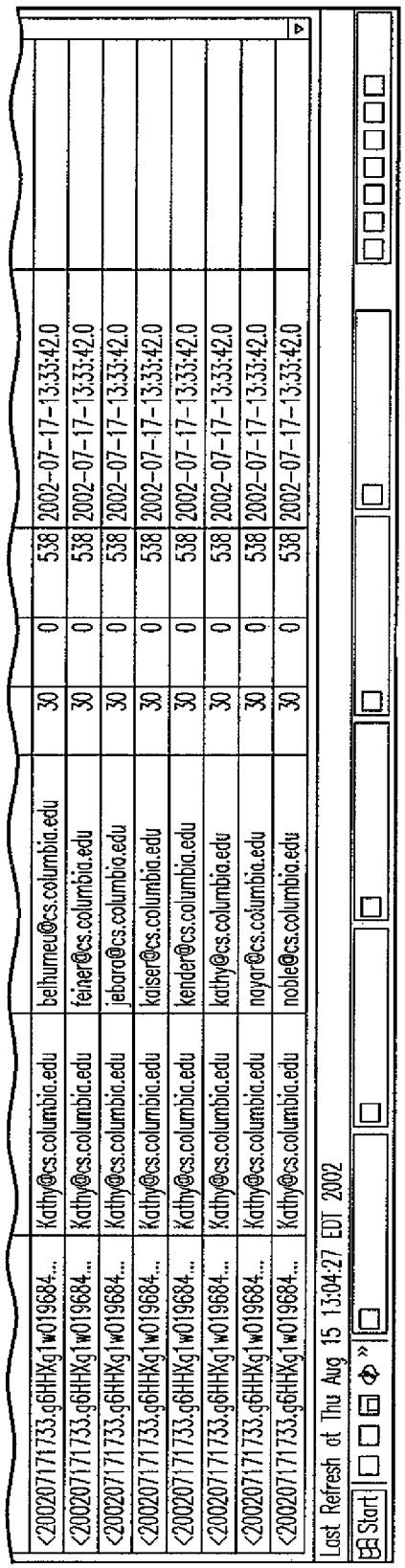
Figure 3A:
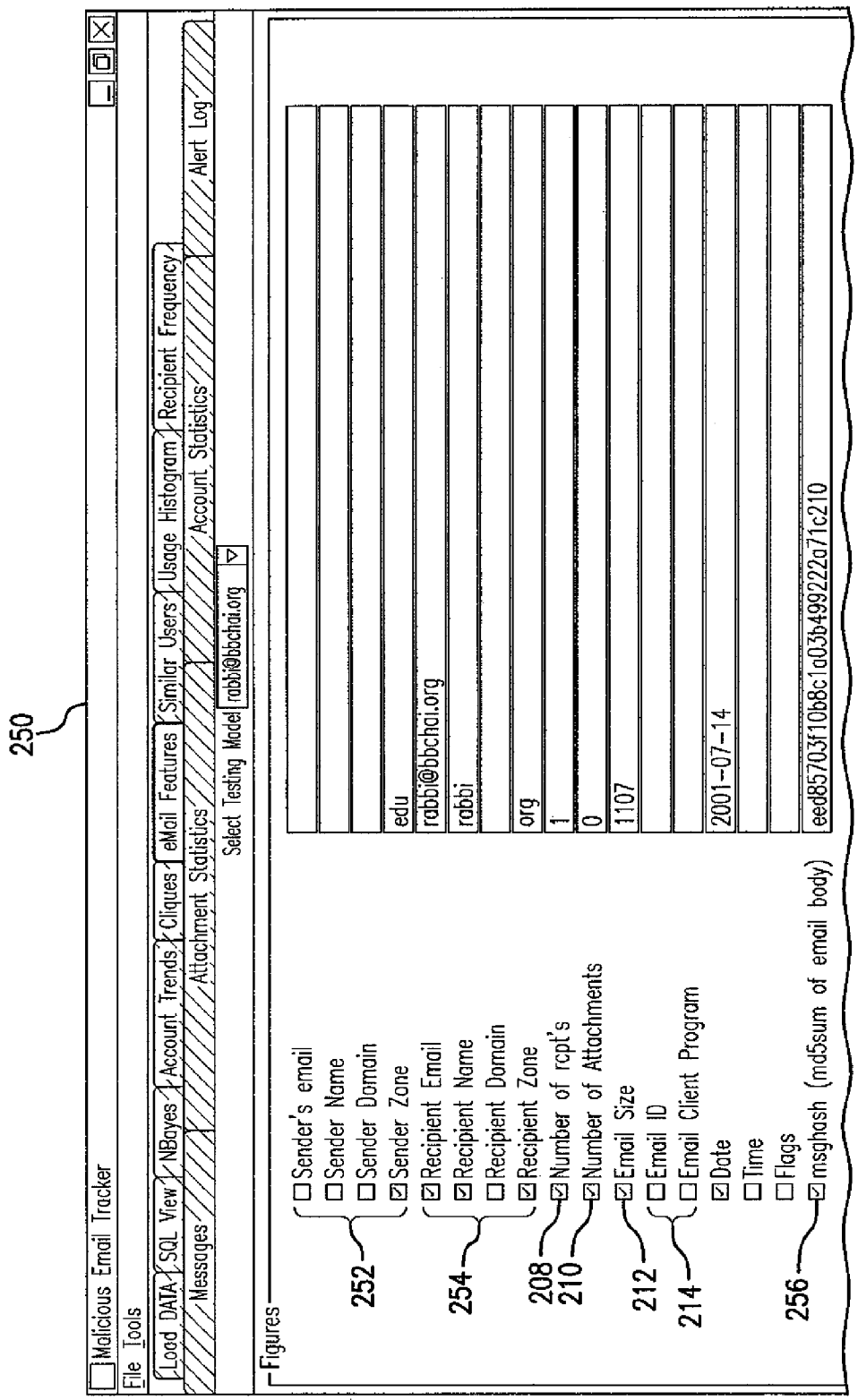

The server 40 has several functions. The server 40 may be responsible for propagating an updated list of unique identifiers associated with known malicious viruses to the clients 20. This propagation is automated which allows for rapid update of the clients 20 immediately when a new malicious virus is discovered. The server 40 is responsible for aggregating statistics obtained from the reports from clients 20 which allows the system 10 to monitor violations of security policies at a global level. The information contained in each record is shown in FIGS. 2-3, which illustrates screens of the user interface for system 10. The fields correspond to information that the server 40 needs to either query the client 20 for more information, or to compute basic aggregate statistics.

Screen 200 (FIG. 2) displays information concerning all emails which are transmitted through the system. For each email, a reference code 202 is assigned, the sender email account 204, the recipient email account 206, and the number of recipients 208 are noted. Also indicated is the number of attachments 210, the size of the email 212, and the time and date 214 of transmission. Finally, the email is classified as "interesting" or "not interesting" or a similar category, such as malicious, benign, or borderline, as will be described in greater detail below.

Screen 250 (FIG. 3) illustrates a number of features that may be stored and displayed for each email. For example, further information on the sender 252, e.g., sender's email, sender's name, etc., and information on the recipient 254, e.g., recipient's email, recipient's name, etc., may be stored and displayed. However, it is also important in certain contexts to maintain the identify of email accounts in confidence.

It is therefore important to have a de-identified user account which tracks a particular account, but which does not reveal the identity of the account. A privacy feature is accomplished in the exemplary embodiment by way of an MD5 hash algorithm, as described above, or equivalent which is applied to each email address, thereby creating a unique alphanumeric identifier 256 for the email, but which does not reveal the email address. Alternatively an alphanumeric code may be similarly created for the email address of the sender (not shown). The sender information 252 is blank in screen 250. This may of de-identifying email may be a useful feature for a security personnel working with the system who may not have authorization to know the true email addresses that may cause alerts. In such instance, a higher authority may be required to inspect any such alerts and would have access to the mapping from the real email address to the unique identifier.

Figure 4A:
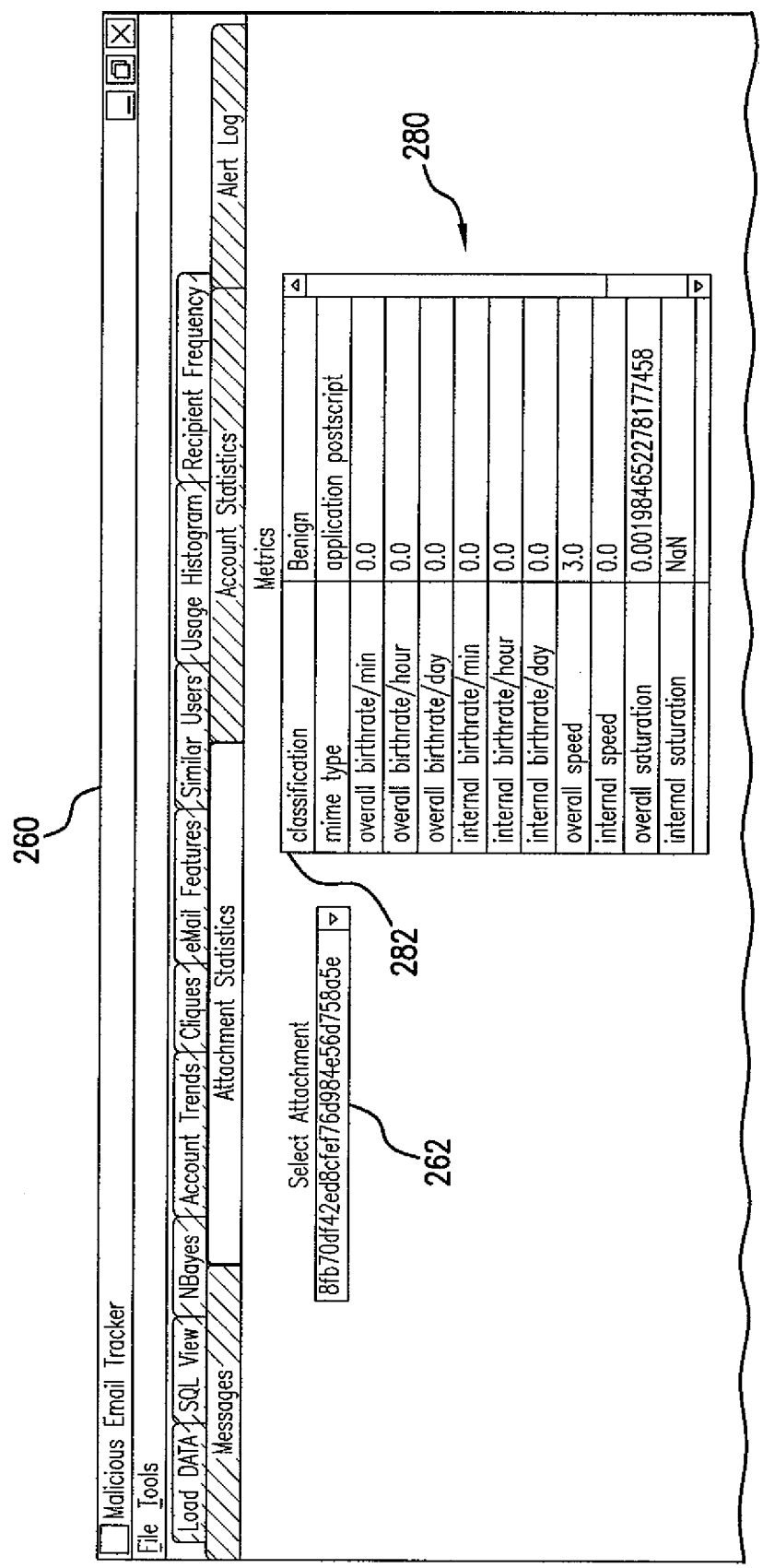
FIGS. 4A-4B (collectively "FIG. 4" herein) depict yet another screen of the user interface, illustrating information displayed concerning attachments to emails transmitted through the system in accordance with the present invention.
Figure 4B:
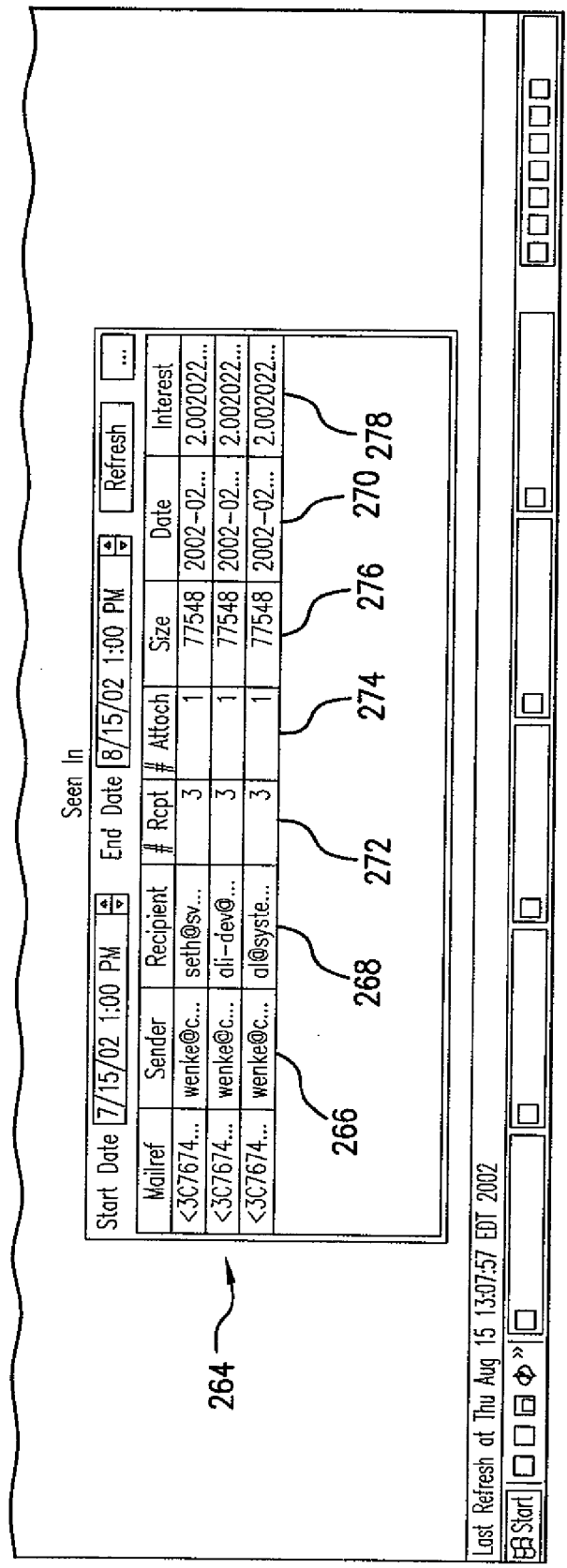

Information concerning attachments as illustrated in FIG. 4. Screen 260 of the user interface of the exemplary embodiment illustrates that each attachment is represented by a unique MD5 hash identifier 262, as discussed above. Information regarding the transmission of the attachment is stored and illustrated in table 264. In particular, table 264 duplicates some of the information of screen 200 (FIG. 2) and indicates the sender email account 266, the recipient email account 268, and the time and date of transmission 270 of each email which included the attachment. Further information recorded is the number of recipients 272 of the particular email that included the attachment, the total number of attachments 274 in that email, and the size of the attachment 276. Further information is the level of "interest" 278 of the attachment, which is a numerical figure generated, for example, by a probabilistic model such as Naive Bayes, regarding whether the attachment is malicious, benign or borderline, as determine by a virus scanner, or by the technique described in U.S. patent application Ser. No. 10/208,432, filed Jul. 30, 2002, entitled "System and Methods for Detection of New Malicious Executables," which is incorporated by reference above. Table 280 includes the classification malicious, benign or borderline, which is derived from the level of interest 278, above. Additional information about the birthrate, and other statistics about the attachment are recorded and displayed in screen 260.

This information may be stored on database 24 of client 20 and distributed to the server 40 (and database 42), and in turn to others clients 20, which could update its local database 24 by including the unique attachment identifier along with its classification as malicious, so that any future emails that appear with an attachment whose MD5 hash matches the unique identifier would cause each client to alert on that email as containing a malicious attachment. MySQL, for example, may be used in the exemplary embodiment, which is a well-known open source database system.

The server 40 also contains a data analysis component 44 which performs the analysis over these records, such as computation or updating of statistics in the database 42 about attachments or emails, as well as application of probabilistic or statistical models or tests in order to generate alerts of emails or attachments that violate security policy. For example, a model which is used to classify an attachment as benign, malicious, or borderline may be performed at the data analysis component 44. This model may be updated with additional training data, which may be different from the model that is used to classify attachments at the client 20. A communication component 46 manages the communication with multiple clients 20. The communication between the server 40 and the client 20 consists of messages passed on a secured channel using encryption and authentication mechanisms.

When a client 20 reports an incident of a received email attachment that is violative of a security policy, it may report a unique incident identification number, the unique identifier of the attachment, the date and time of the attack, the prevalence, and the birth rate.

Additional statistics may be computed for each attachment and stored on databases 24/42 and displayed, for example, in table 280 of screen 260 of the user interface. A virus incident is the fraction of the total number of clients 20 within an organization infected by a particular virus, due to a single initial infection from outside the organization. Since each attachment is saved in the local database 24 with a Unique identifier and malicious or benign classification, this value is simply the number of times each malicious unique identifier appears in the local database 24. The lifespan is the length of time a virus is active. This value is calculated by subtracting the first time a virus is seen from its last occurrence in the local repository. This values reports the amount of time a virus was free to cause damage to a network before it was detected. The Incident rate is the rate at which virus incidents occur in a given population per unit time, normalized to the number of clients 20 in the population. This is calculated by the server 40 based on the virus incident values reported by the local server. The death rate is the rate at which a virus is detected. This is calculated by the server 40 by taking the average lifespan of the virus. The system prevalence is a measure at the system level of the total number of clients 20 infected by a particular virus. This value is calculated by the central repository by summing over the number of local hosts reporting the same virus. The threat is the measure of how much of a possible danger a virus may be. In an exemplary embodiment, threat is calculated as the incident rate of a virus added to the prevalence of a virus divided by the total number of participating clients 20 and the total number of viruses. Spread is a measure of the global birth rate of a virus. This is calculated by taking the average of the birth rates reported by the participating clients 20. These metrics may be directly implemented by computing SQL aggregates over the databases (both local 24 and central 42). Each time a client 20 determines that an attachment is a virus, it sends a report to the server 40, and the server 40 updates it statistics for that virus.

The system 10 may also gather statistics about the behavior and features of individual email accounts 26, which is a representation of the users of these accounts. The information gathered about individual emails, as well as email accounts themselves, is useful to detecting violations of an email security policy. For example, email account statistics may be derived for recipient and sender email addresses recorded in the database. The statistics gathered about the prior transmission of email to and from a particular email account can be used as training data to create a probabilistic or statistical model of an email account. This model provides a profile of the past or baseline behavior patterns of a particular email account. The selected behavior may refer to a particular time frame of interest, e.g., the previous month. Where the selected behavior of the particular email account deviates from this profile of prior or baseline behavior, the system 10 may issue an alert that a violation of an email security policy has occurred.

This profile of behavior patterns may be represented as a histogram, for example. A histogram is a way of graphically showing the characteristics of the distribution of items in a given population of samples. In the exemplary embodiment, histograms are used to model the behavior of particular email accounts. From a training set, e.g., the statistics as discussed above, a histogram is constructed to represent the baseline behavior of an email account. A histogram is also created to represent selected behavior of the email account.

Histograms may model statistics, e.g., events or operations, which are accumulated over a fixed time period. Each bin in the histogram counts some number of events in fixed time periods. For example, a histogram may record the average number of emails sent by an email account each day during the previous month, wherein each bin represents a day, hour, or other time period. Alternatively, histograms may model statistics accumulated irrespective of a time period. In such case, each bin is not a fixed time period, but some other feature. For example, over a set of emails from an arbitrary time period (gathered over a month, or gathered over a year, etc.) a histogram recording the number of email sent to a distinct recipient, wherein each bin represents a recipient, for example.

Figure 5A:
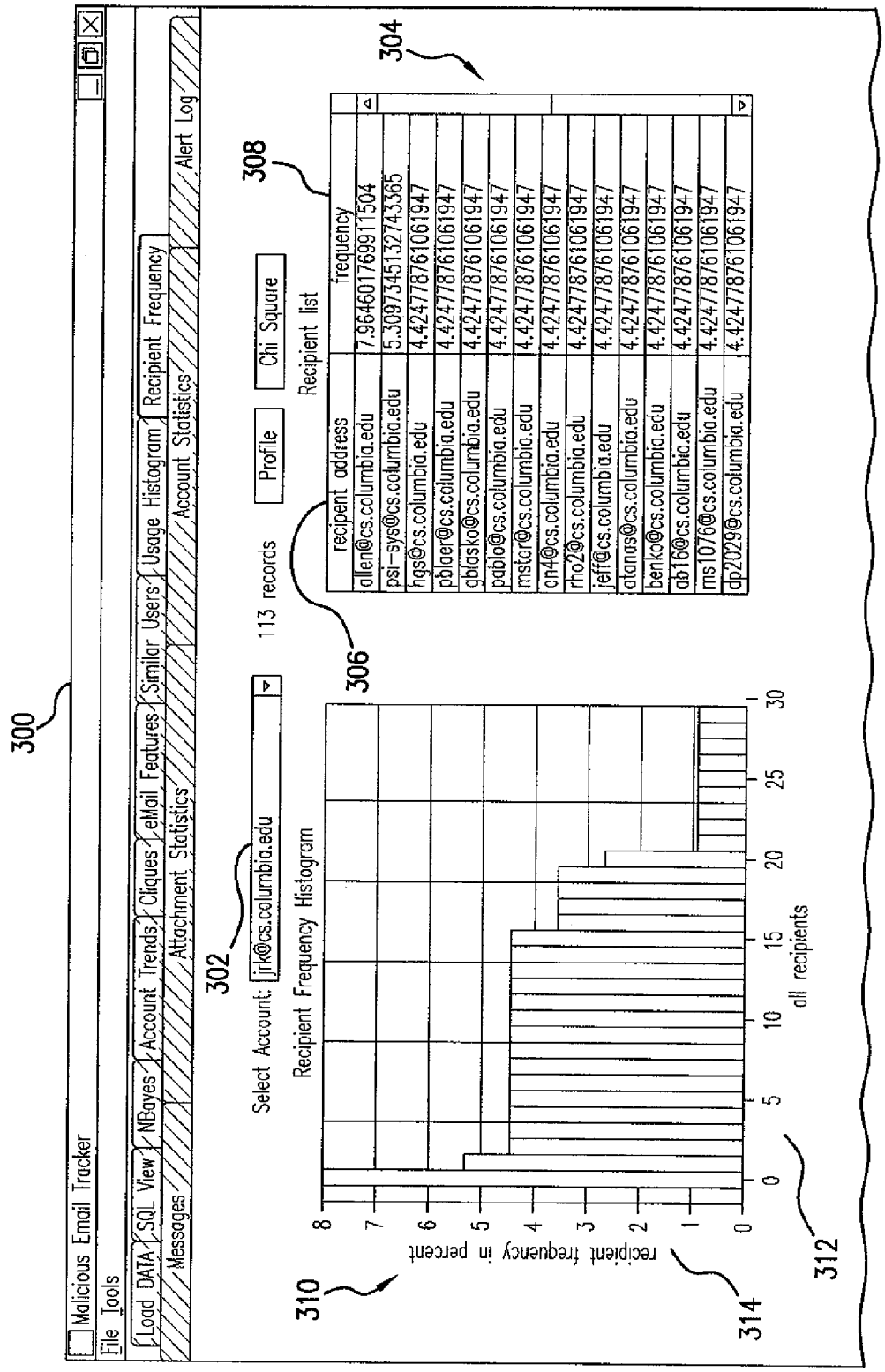
FIGS. 5A-5B (collectively "FIG. 5" herein) depict a further screen of the user interface, illustrating information displayed concerning email accounts in accordance with the present invention.
Figure 5B:
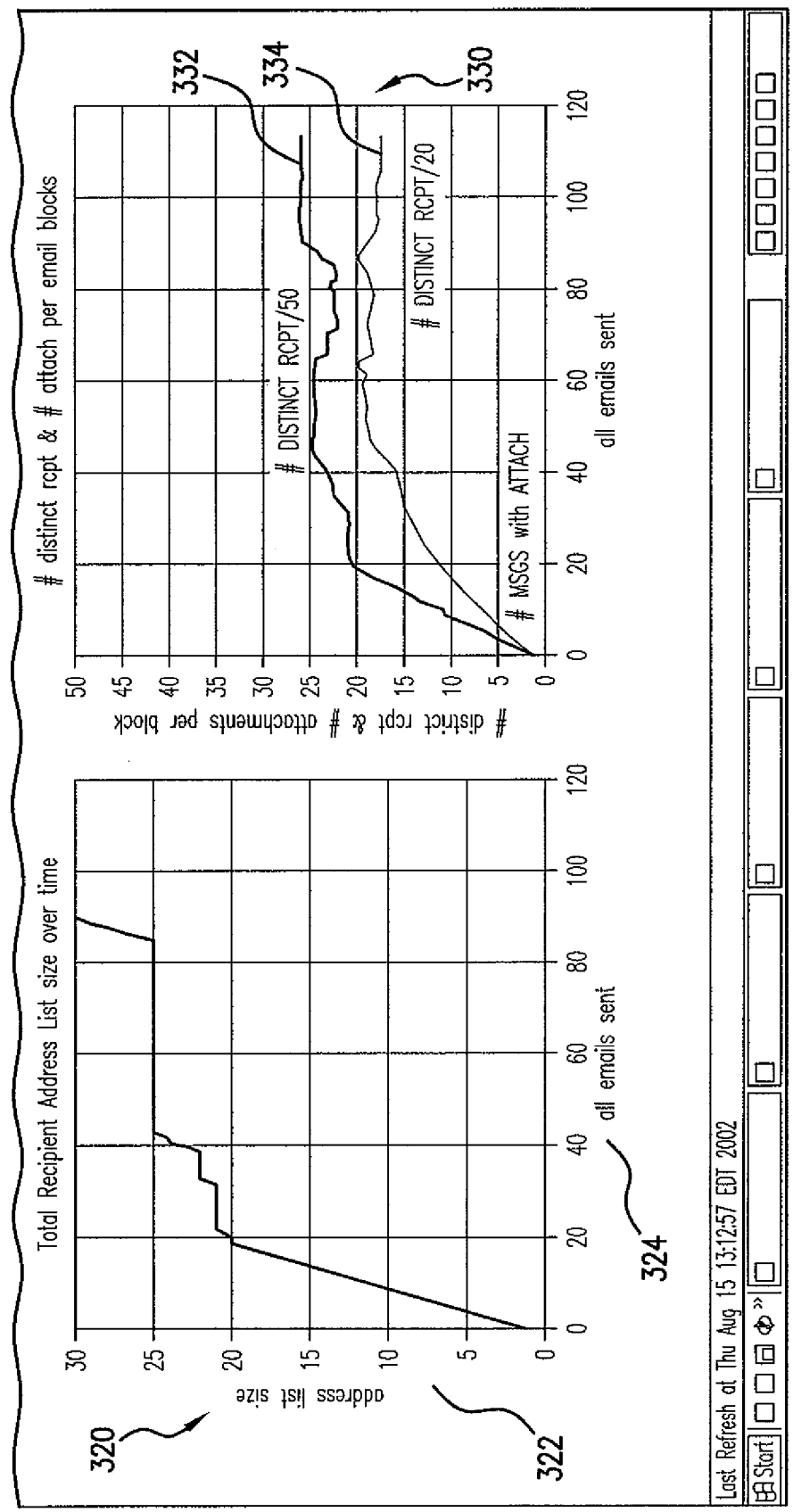

FIG. 5 illustrates a screen 300 in the user interface of the exemplary embodiment, which illustrates histograms that may be stored for an email account 302 In the example, statistics are gathered for an email account 302 over a predetermined period of time, e.g., the previous twelve months. The system counts the number of emails sent by this email account 302 to a specific recipient. Table 304 shows each recipient email address 306 and the relative frequency 308 at which user account 302 has emailed each recipient. In histogram 310, each recipient would be considered a bin 312, which indicates the frequency of emails 314 for each recipient. If an email account has sent emails over the past twelve months to 900 different email accounts, for example, then the email account's profile histogram would have 900 bins. A histogram computed over the twelve months would serve as a statistical model of baseline behavior of the email account. The histogram's bins can be ordered from "most frequent" recipient to "least frequent" recipient and display these as a bar graph 310 (as in FIG. 5), or alternatively, the statistics may be represented as a continuous function or a plotted graph. The bins of the histogram may be ordered differently, by for example, sorting the recipient names, or grouping recipients according to email domain. A histogram of selected behavior may include bins for each email recipient, and taken over the selected time period.

A sequential profile can be represented which is irrespective of the quanta of time measured (non-stationary), but which instead uses each email as a measurement point. With continued reference to FIG. 5, plot 320 illustrates the number of recipients 322 who received email from user account 302. The list grows over the history of recorded emails as more emails 324 are sent. Graph 320 monotonically increases for each sequential email measured. The growth rate of this plot indicates a profile of the email account. A plot that is very slowly increasing indicates that the email account does not exchange emails with very many new email accounts. While another email account may have a very fast growing profile, perhaps indicating that the user of the email account may be contacted by very many new people. A histogram for normal behavior may be taken over one time period, and histogram for new behavior may be taken over a second time period. Graph 330 illustrates the distinct number of recipient per 50 emails sent (dashed line 332) and the distinct number of recipients per 20 emails sent (dotted line 334). As another example, the first 100 emails sent in order over some time period by an email account were sent to ten distinct email addresses. In the $101^{st}$-$110^{th}$ emails, no new email addresses are seen that are distinct from those seen in the first 100 emails. However, two new distinct email addresses are seen in the $112^{th}$ email. For this email, we have a net gain of two more emails. Such growth rates are statistics that may be used to detect violations of security policy.

Once such histograms have been created, the histogram of the baseline behavior is compared with the histogram of the selected behavior to determine whether the new behavior represents a deviation that may be classified as a violation of email security policy. There are many known methods to compute the histogram dissimilarity. Generally such methods may be divided into two categories: One method is using a histogram distance function; the other method is to use a statistics test. A histogram can be represented by a vector.

Histograms may be compared with the L1 form distance equation. Histogram intersection is represented in equation (1), where X and Y are vectors representing the normal behavior histogram and the new behavior histogram. M is the number of bins in histogram.

$$L(X, Y) = 1 - \frac{\sum_{i=0}^{M-1} \min(X[i], Y[i])}{\min\left(\sum_{i=0}^{M-1} X[i], \sum_{i=0}^{M-1} Y[i]\right)} \quad (1)$$

When the sums of X[i] and Y[i] are equal, the histogram intersection formula of equation (1) may be simplified to the L1 form distance equation (2):

$$L_1(X, y) = \sum_{i=0}^{M-1} |X[i] - Y[i]| \quad (2)$$

Alternatively, histograms may be compared with the L2 form distance equation (3):

$$L_2(X, Y) = \sum_{i=0}^{M-1} (X[i] - Y[i])^2 \quad (3)$$

The L1 and L2 form equations assume that the individual components of the feature vectors, e.g., the bins of the histograms, are independent from each other. Each of the bins are taken to contribute equally to the distance, and the difference of content between the various bins is ignored.

Other distance equations are the weighted histogram difference equations, e.g., the histogram quadratic distance equation and the histogram Mahalanobis distance equation. The histogram quadratic difference equation (4) considers the difference between different bins.

$$D(X,Y) = (X-Y)^T A (X-) \quad (4)$$

In equation (4), A is a matrix and $a_{ij}$ denotes the similarity between elements with index i and j. A symmetry is assumed, such that $a_{ij}=a_{ji}$, and $a_{ii}=1$.

The Mahalanobis distance is a special case of the quadratic distance equation. The matrix A is given by the covariance matrix obtained from a set of training histograms. Here, the elements in the histogram vectors are treated as random variables, i.e., $X=[x_0, x_1, \ldots, x_{M-1}]$. The covariance matrix B is defined as $b_{ij}=Cov(x_i,x_j)$. The matrix A is thus defined as $A=B^{-1}$. When the $x_i$ are statistically independent, but have unequal variance, matrix B is a diagonal matrix:

$$B = \begin{bmatrix} \sigma_0^2, 0, 0, \ldots, 0 \\ 0, \sigma_1^2, 0, \ldots, 0 \\ 0, \cdots 0, 0 \\ 0, \ldots 0, 0, \sigma_{M-1}^2 \end{bmatrix} \quad (5)$$

This method requires a sufficiently large training set (of prior email transmission statistics) in order to allow the covariance matrix to accurately represent the training data.

The chi-square test is used to test if a sample of data came from a population with a specific distribution. It can be applied to any uni-variance distribution for which it is possible to calculate the cumulative distribution function. However, the value of chi-square test statistic depends on how the data is binned, and it requires a sufficient sample size. The chi-square test is represented by equation (6):

$$\chi^2 = \sum_{i=1}^{k} (O_i - E_i)^2 / E_i \quad (6)$$

where k is the number of bins $O_i$ is the observed frequency for bin i, and $E_i$ is the expected frequency. The expected frequency is calculated as:

$$E_i = N(F(Y_u) - F(Y_l)). \quad (7)$$

where F is the cumulative distribution function, $Y_u$ is the upper limit for class i, $Y_l$ is the lower limit for class i, and N is the sample size.

The Kolmogorov-Simironov test (the "KS test") is a statistical test which is designed to test the hypothesis that a given data set could have been drawn from a given distribution, i.e., that the new behavior could have been drawn from the normal behavior. The KS test is primarily intended for use with data having a continuous distribution, and with data that is independent of arbitrary computational choice, such as bin width. The result D is equal to the maximum difference between the cumulative distribution of data points.

$$D = \max\{|F'(x) - F(x)|\}, F'(x) = (\text{num\_of\_samples} \leq x)/N \quad (8)$$

and where N is total number of samples The KS test does not depend on the underlying cumulative distribution function which is being tested, and it is an exact test (when compared with the Chi-Square test, which depends on an adequate sample size for the approximations to be valid). The KS test may only be applied to continuous distribution; it tends to be more sensitive near of the center of the distribution than at the tails.

Figure 6:
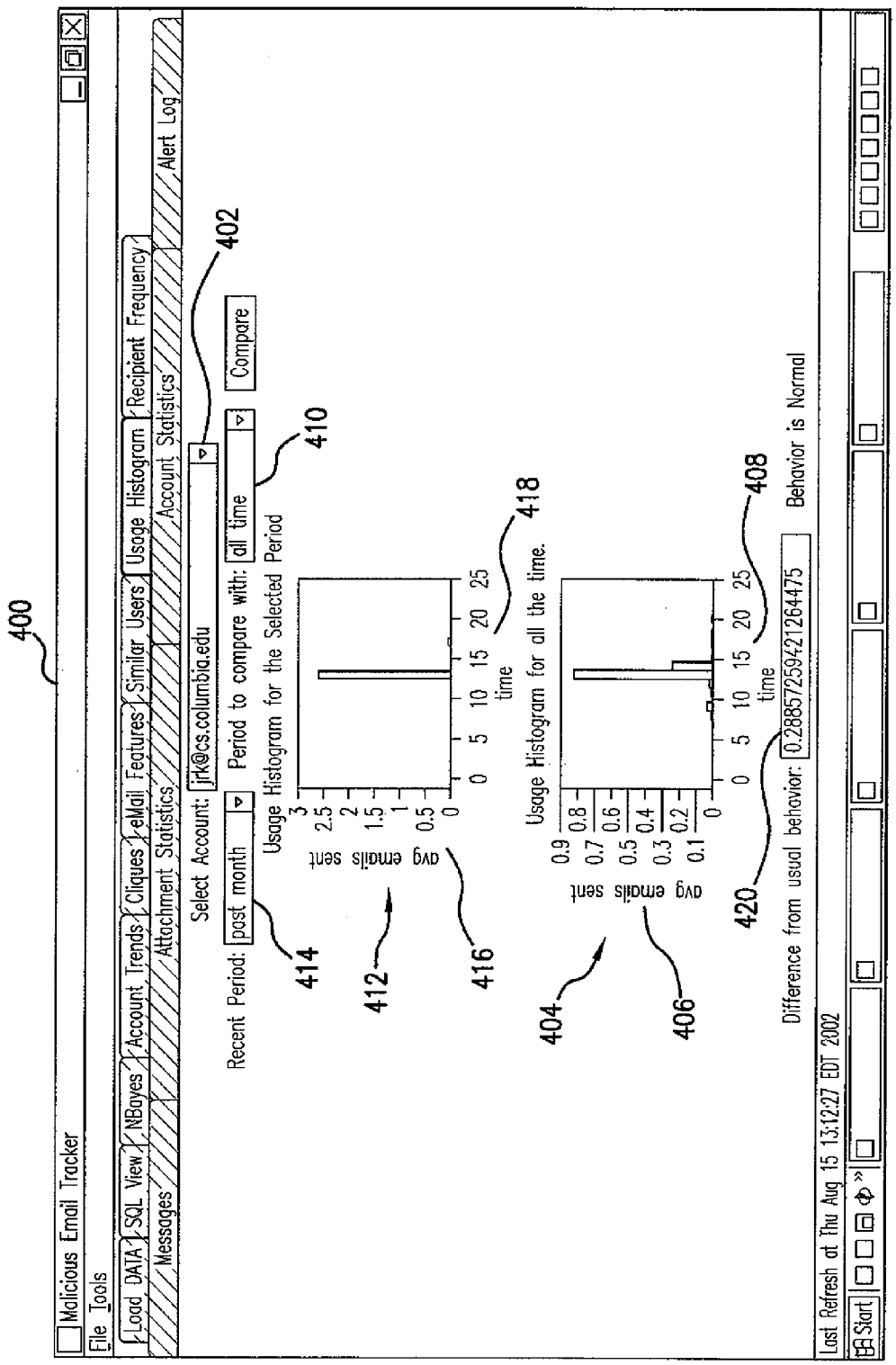
FIG. 6 is a screen of the user interface, illustrating histograms of email transmission by an email account in accordance with the present invention.

The modeling of the behavior of an email account may include defining a model based on the time of day in which emails are transmitted by a particular email account. FIG. 6 illustrates screen 400, which compares such email transmission for user account 402. Histogram 404 illustrates the average number of emails 406 sent for each bin 408, which represents each hour of the 24 hours in a day. The data in histogram 404 is accumulated for a predetermined period of time, e.g., the entire period that user account 402 has been tracked by the system 10 (time period 410). Histogram 412 is created for email transmission during a selected period of time being analyzed, e.g., the last month (time period 414). Histogram 412 illustrates the average number of emails 416 sent during each hour as represented by bins 418. The histogram 404 of baseline behavior is compared with the histogram 412 of the selected behavior, with a comparison equation such as the Mahalanobis distance equation, above, to produce a distance result 320. A threshold is set, which determines whether such a calculated difference is normal or may possibly violate security policy. The threshold may be determined by training on known data representative of email account behavior which violated security policy, when compared with known, normal, email behavior. The histogram 404 of the baseline behavior of user email account 302 shows that emails are rarely sent early in the morning. Thus, a violation in the security policy may be detected if a series of email are transmitted from user email account 302 at such time of day. Similarly, the modeling of the behavior of an email account may include defining a model based on the size of the emails that are transmitted by an email account or on the number of attachments that are transmitted by the email account Another method for defining a model relating to the transmission of emails from one of the email accounts is based on the email addresses of the recipients of emails transmitted by the particular email account. Thus, another statistic or feature gathered by the method in accordance with the invention is the email addresses of recipients in each email. The recipients of the emails may be grouped into "cliques" corresponding to email addresses historically occurring in the same email.

A clique is defined as a cluster of strongly related objects in a set of objects. A clique can be represented as a subset of a graph, where nodes in the graph represent the "objects" and arcs or edges between nodes represent the "relationships" between the objects. Further, a clique is a subset of nodes where each pair of nodes in the clique share the relationship but other nodes in the graph do not. There may be many cliques in any graph.

Figure 7:
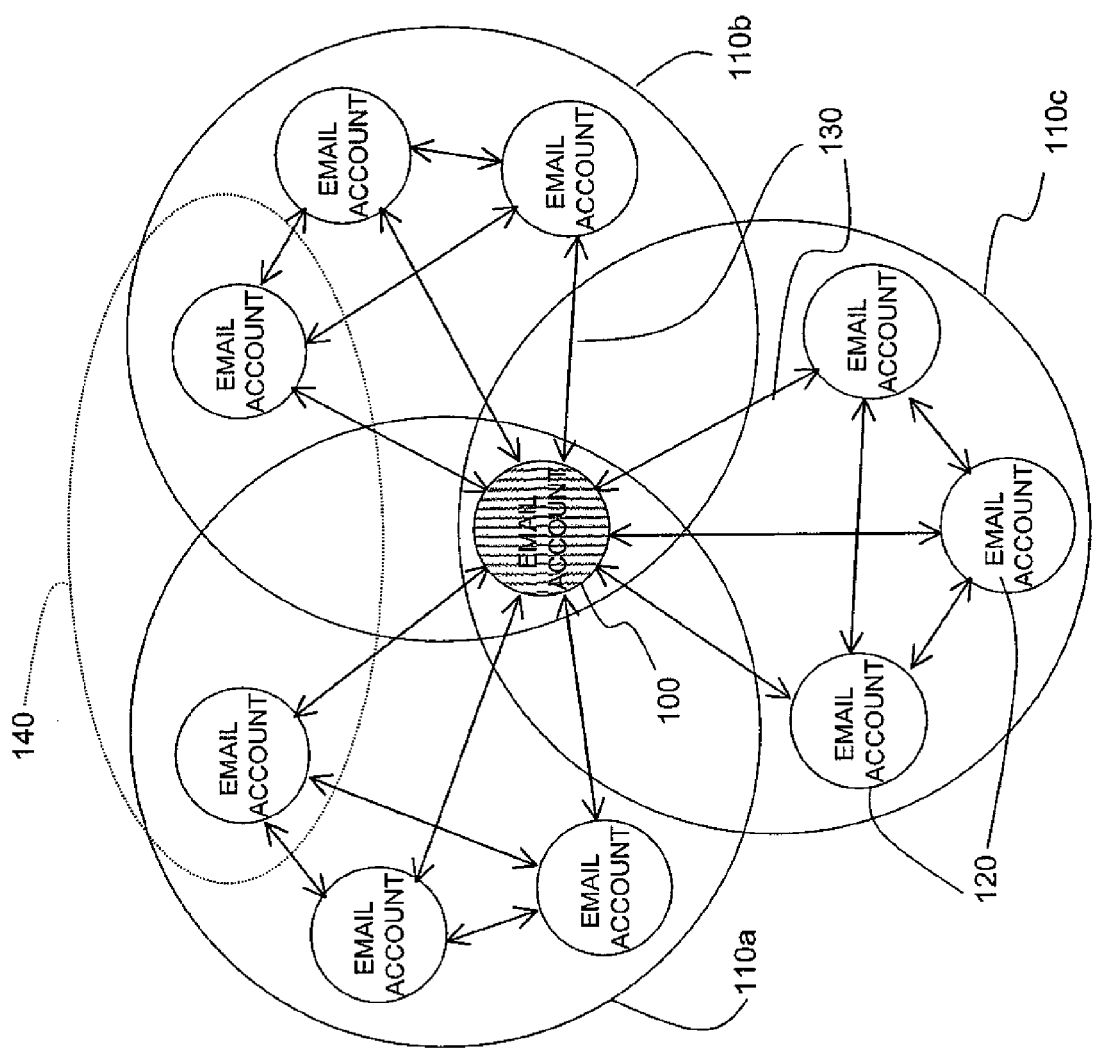
FIG. 7 is a sample chart illustrating the relationship of email accounts and emails between various email accounts on a system in accordance with the present invention.

In this context, the nodes are email addresses (or accounts) and the edges represent the "emails" (and or the quantity of emails) exchanged between the objects (email accounts). Each email account is regarded as a node, and the relationship between them is determined by the to:, from:, and cc: fields of the emails exchanged between the email accounts. As illustrated in FIG. 7, a selected email account 100 induces its own set of cliques 110a, 110b, 110c, which are clusters of email accounts 120 of which it is a member. Each member in the clique has been determined to historically exchange emails 130 with each other. This modeling of email cliques is based on the premise that a user's "social cliques" and the nature of the relationship between members of a clique can be revealed by their "email cliques."

The relationship between nodes that induces the cliques can be defined under different periods of time, and with different numbers of emails being exchanged, or other features or properties. For example, an edge (as represented by line 130 in FIG. 7) between email account UserA@z.com and email account UserB@z.com may be represented if UserA and UserB have exchanged at least N emails over the time period T. (As one varies N, the cliques revealed may change.) As another example, an edge between UserC and UserD may be represented if they have exchanged at least N emails with each other in the time period T, and each email is at least K bytes long. Such features of emails are based upon the kind of information an analyst may wish to extract from a set of emails. As a further example, one may define the clique relationship to be the set of accounts that exchange at least N emails per time period T and which include certain string of text S. (Further details concerning clique finding algorithms and related problems are disclosed in *Cliques, Coloring and Satisfiability: Second Dimacs Implementation Challenge*, D. Johnson and M. Trick, Ed., 1993, which is incorporated by reference in its entirety herein.)

FIG. 7 illustrates the email behavior of the user of email account 100. For example, the three clusters may represent cliques of social acquaintances 110a, clients 110b, and coworkers 110c. (Although four email accounts are shown in each clique 110a, 110b, and 110c, it is understood that the number of email accounts may be larger or smaller depending upon the historical email use of the particular email accounts.) Each of these groups of users with their own email accounts 120, have a relationship with the user of email account 100. Members of different cliques, i.e., social acquaintances 110a and clients 110b are unlikely to have common interests or concerns. Thus, it is unlikely that the user of email account 100 would send the same email to both cliques. More particularly, it is unlikely that email account 100 would send an email 140 addressed to both an email account in clique 110a and an email account in clique 110b (illustrated in dotted line).

Cliques are determined according to any number of known methods. In the exemplary embodiment, cliques are modeled as described in C. Bron and J. Kerbosch. "Algorithm 457: Finding All Cliques of an Undirected Graph," *Communications of ACM*, 16:575—577, 1973, which is incorporated in The Appendix and the attached routine Clique_finder.

First, the graph is built by selecting all of the rows from the email table in the database. As illustrated in FIG. 2, above each row contains the sender 204, and the recipient 206. The subject line may also be stored (although not illustrated in FIG. 2).

A first step is to check an aliases file against the sender and recipient to map all aliases to a common name. For instance, a single user may have several accounts. This information, if available, would be stored in an aliases file.

Figure 8:
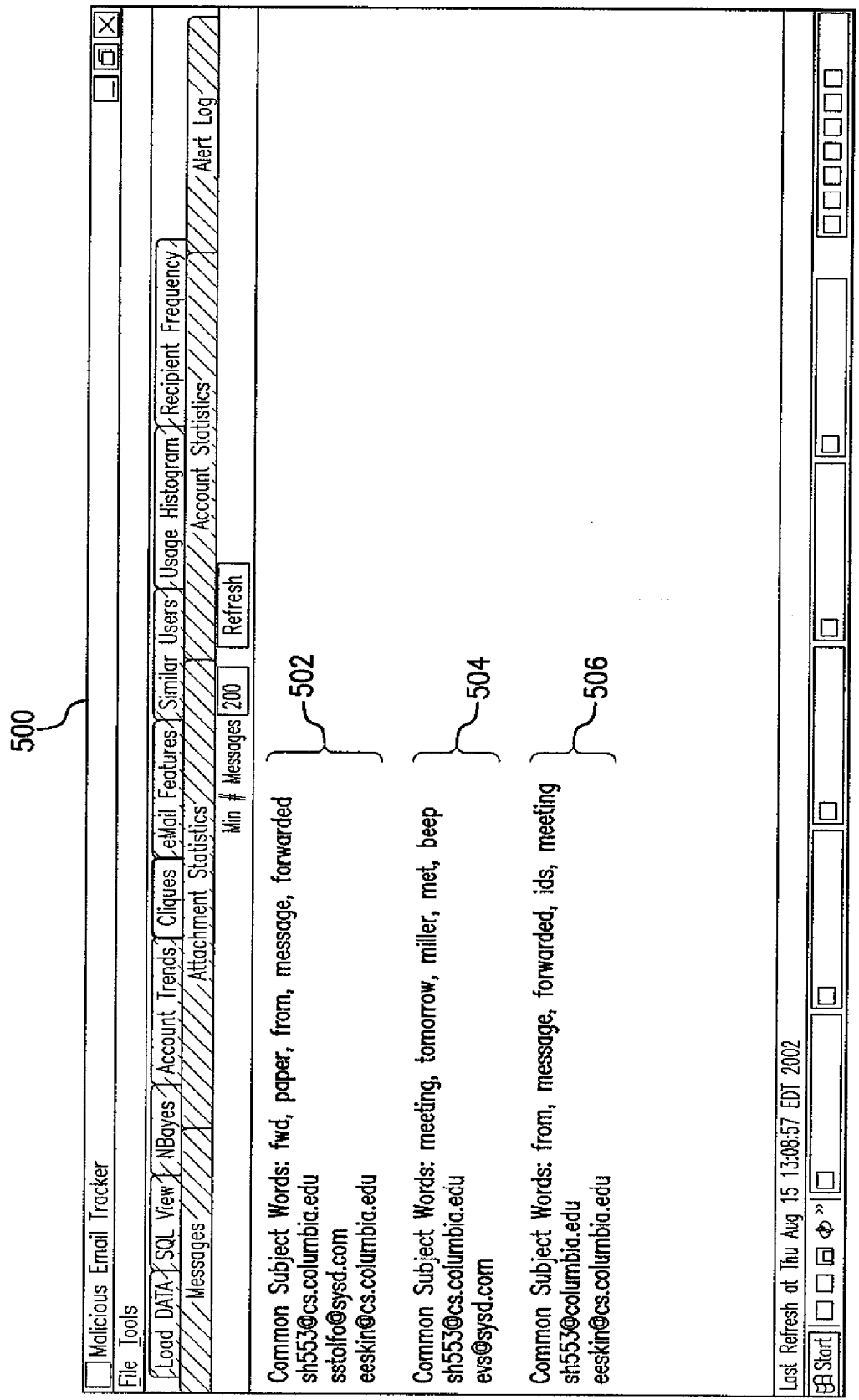
FIG. 8 is a screen of the user interface, illustrating information displayed concerning groups or cliques of email accounts in accordance with the present invention.

The edge between sender and recipient is updated (or added if it doesn't already exist). (The edge is represented as line 130 in FIG. 7.) Each edge of the graph may have associated with it (1) the number of emails that traversed that edge and (2) a weighted set of subject words where each word has a count of the number of times it occurred. The edge's weight is incremented by one, and the weighted set of subject words associated with the edge is augmented by the set of subject words from the current message. Cliques are represented in screen 500 of the user interface in FIG. 8. Cliques 502, 504, and 506 are displayed, along with the most common subject words in emails transmitted among members of the clique.

A next step is pruning the graph. The user inputs a minimum edge weight, or minimum number of emails that must pass between the two accounts to constitute an edge, and any edges that don't meet that weight are eliminated. For example, the minimum number of emails may be determined from the average number of emails sent by the email account over a similar time period.

Subsequently, the cliques are determined. Throughout this process, there exist four sets of data: (1) *compsub* represents a stack of email user accounts representing the clique being evaluated. Every account in *compsub* is connected to every other account. (2) *candidates* represents a set of email user accounts whose status is yet to be determined. (3) *not* represents a set of accounts that have earlier served as an extension of the present configuration of *compsub* and are now explicitly excluded. (4) *cliques* represents a set of completed cliques In the exemplary embodiment, these are implemented using the Java Stack and HashSet classes rather than the array structure suggested in the Bron & Kerbosch in The Appendix and the routine Clique_finder attached herein.

The algorithm is a recursive call to extendClique( ). There are five steps in the algorithm: Step 1 is the selection of a candidate, i.e., an email user account which may be prospectively added to the clique. Step 2 involves adding the selected candidate to *compsub* . Step 3 creates new sets *candidates* and *not* from the old sets by removing all points not connected to the selected candidate (to remain consistent with the definition), keeping the old sets intact. Step 4 is calling the extension operator to operate on the sets just formed. The duty of the extension operator is generate all extensions of the given configuration of *compsub* that it can make with the given set of candidates and that do not contain any of the points in *not*. Upon return, step 5 is the removal of the selected candidate from *compsub* and its addition to the old set *not*.

When *candidates* and *not* are both empty, a copy of *compsub* is added to *cliques*. (If *not* is non-empty it means that the clique in *compsub* is not maximal and was contained in an earlier clique.) A clique's most frequent subject words are computed by merging and sorting the weighted sets of subject words on each edge in the clique.

If we reach a point where there is a point in *not* connected to all the points in *candidates*, the clique determination is completed (as discussed in The Appendix). This state is reached as quickly as possible by fixing a point in *not* that has the most connections to points in *candidates* and always choosing a candidate that is not connected to that fixed point.

A clique violation occurs if a user email account sends email to recipients which are in different cliques. If an email 140 is detected, this occurrence of an email having a recipient in two different cliques may be considered a clique violation, and may indicate that either a) email account 100 made a mistake by sending an inappropriate message to either a social acquaintance or to a client or b) a self-replicating email attachment has accessed the address book for the email account 100 and is transmitting itself to email accounts in the address-book without knowledge the cliques 110a, 110b, 110c of email account 100.

A strength of the clique violation may be measured by counting the number of such violations in a single email, e.g., the number of recipients who are not themselves part of the same clique, and/or the number of emails being sent, or other features that may be defined (as the system designer's choice) to quantify the severity of the clique violation. (For example, if email account 100 sent one message to 15 recipients, and one of these recipients is not a member of a clique that the other 14 belong to, that may be considered a minor violation compared with another email that is directed to 15 recipients none of whom are members of the same clique.) The strength of the violation may be used to set conditions (or thresholds) which are used to provide alerts in the system 10. Alerts may then be generated based upon the strength of the violation. In another embodiment, those recipients that receive few emails from the sender may be weighted higher than those recipients that receive many emails from the sender.

Clique violations may also be determined from multiple email messages, rather than from just one email. For example, if a set of emails are sent over some period of time, and each of these emails are "similar" in some way, the set of email accounts contained in those emails can be subjected to clique violation tests. Thus, the email recipients of email sent by a particular use is used as training data to train a model of the email account.

If a specific email account is being protected by this method of modeling cliques and detecting clique violations, such violations could represent a misuse of the email account in question. For example, this event may represent a security violation if the VP of engineering sends an email to the CEO concurrently with a friend who is not an employee of the VP's company. Similarly, a clique violation would occur when a navy lieutenant sends a secret document to his commanding officer, with his wife's email account in the CC field. These are clique violations that would trigger an alert.

The techniques described herein can also be used a) to detect spam emails (which may or may not and generally do not have attachments, and b) to detect spammers themselves. Spam generally has no attachments, so other statistics about email content and email account behavior are needed to be gathered here by system 10 in order to also detect spam. Spam can be detected by considering clique violations. In particular, if an email account sends or receives emails from other email accounts that are not in the same clique, an alert may be issued which would indicate that such email transmissions are likely spam.

The methods described above generally refer to defining probabilistic or statistical models which define the behavior of individual email accounts. Also useful are models relating to statistics for emails transmitted by the plurality of email accounts on the computer system.

Detecting email accounts that are being used by spammers may allow an internet service provider or server 40 to stop spam from spreading from their service by shutting down an email account that has been detected as a generator of spam. To detect spammers, these email accounts would have a certain profile of email use that may be regarded as a bad profile as determined by supervised machine learning process, for example. Thus, the notion of profiling i.e., gathering statistics about an email account's behavior, is used here as well. According to this embodiment, email profiles are compared to other email profiles, rather than comparing statistics about emails to profiles.

Figure 9A:
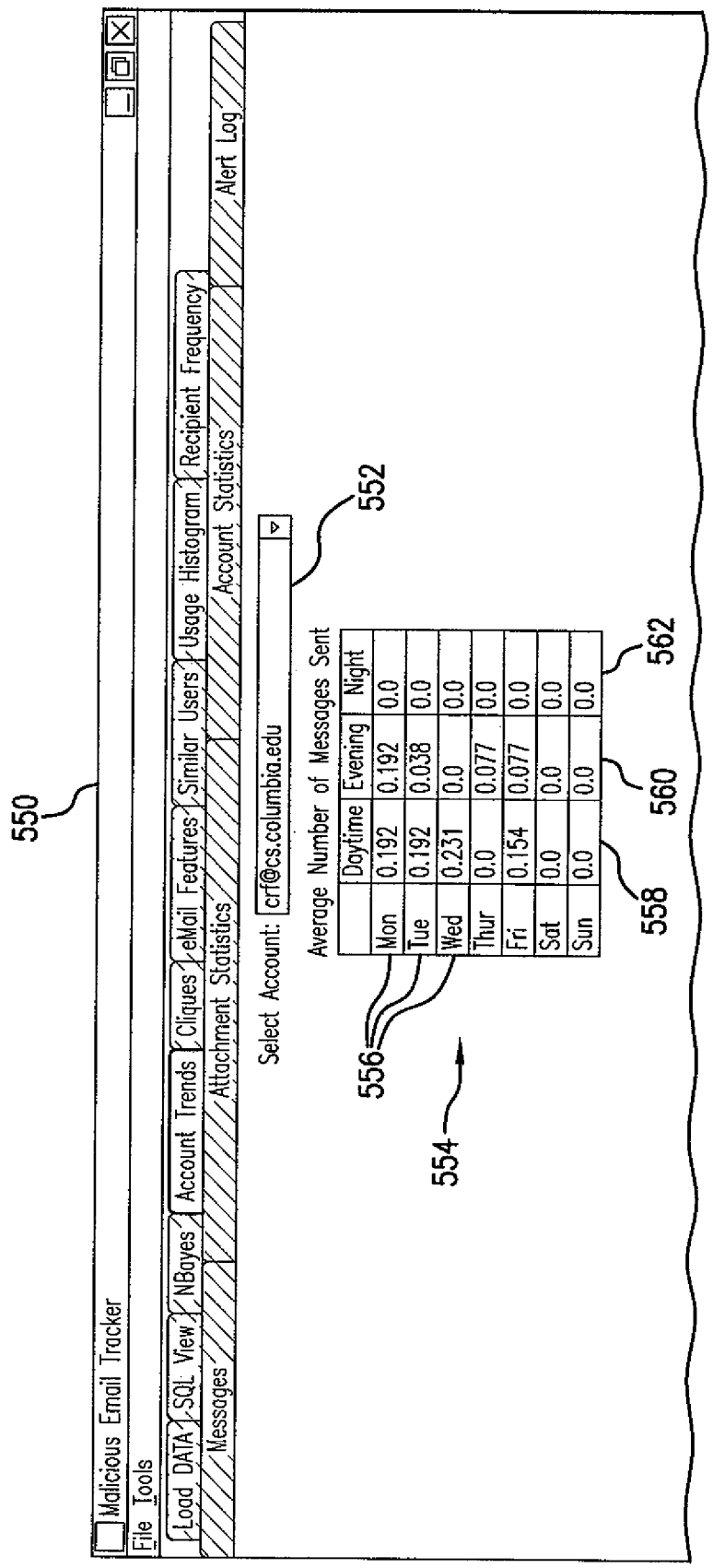
FIGS. 9A-9B (collectively "FIG. 9" herein) depict another screen of the user interface, illustrating information displayed concerning emails statistics of an email account in accordance with the present invention.
Figure 9B:
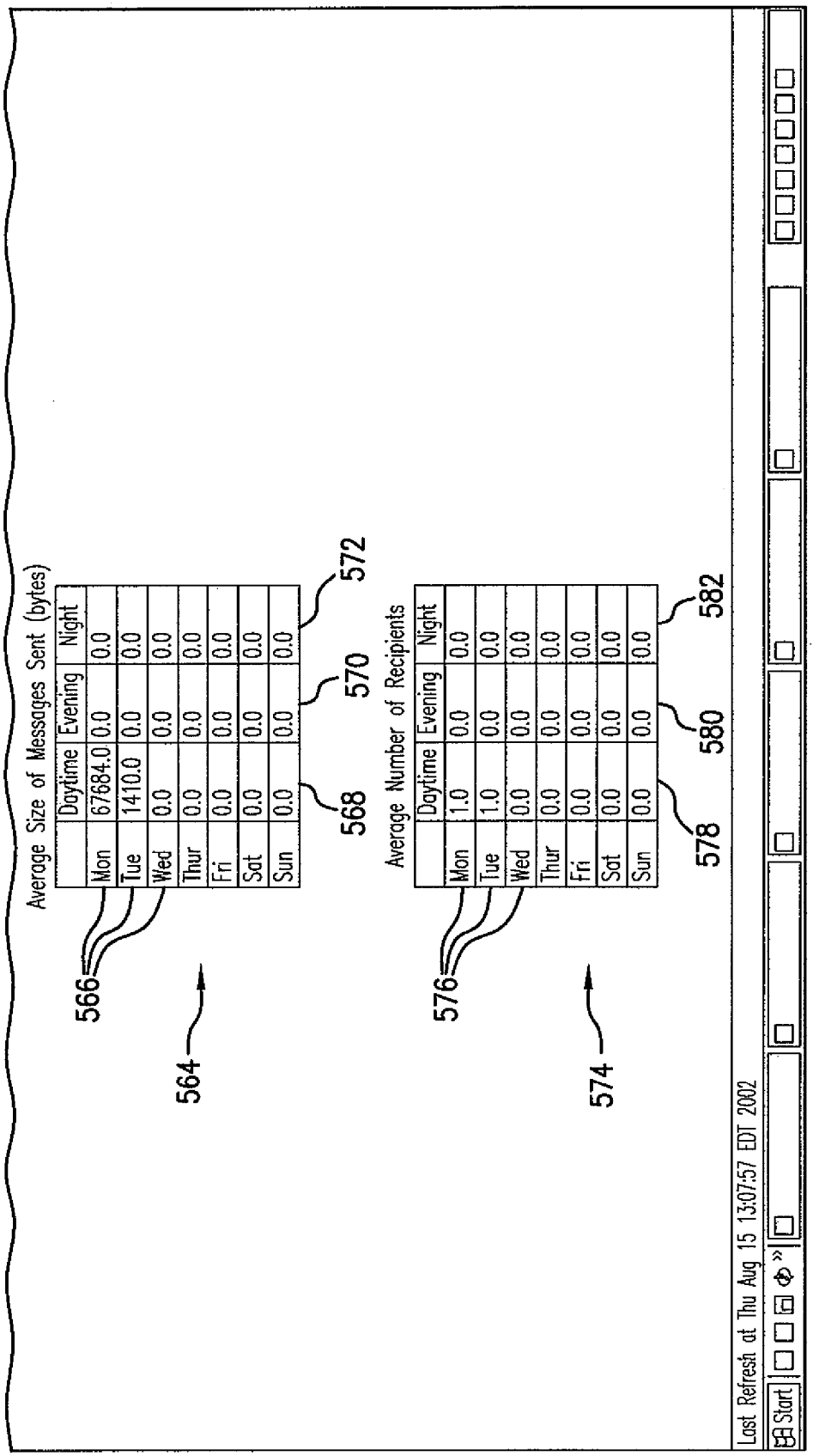

Individual profiles may be represented by histograms in screen 550 of the user interface as illustrated in FIG. 9 for user 552. Histogram 554 indicates the average number of emails sent on particular days of the week 556, and sorted in bins for daytime 558, evening 560, and night 562. Similarly, histogram 564 indicates the average size (in bytes) of emails sent on particular days of the week 566, and sorted in bins for daytime 568, evening 570, and night 572. Histogram 574 indicates the average number of recipients for each email sent on particular days of the week 576, and sorted in bins for daytime 578, evening 580, and night 582.

EXAMPLE

Detection of a "spammer" may be performed by comparing email account profiles, such as those illustrated in FIG. 9. The following three profiles, or models, are created from statistics gathered by the system:

Profile 1: Histogram of average number of emails sent per minute and per day by a user account computed over a one week period. (Table 1)

TABLE 1

| Average Number of Emails Sent | Account A | Account B |
|---|---|---|
| Per minute | 0.5 | 100 |
| Per day | 11 | 12,000 |

Profile 2: Histogram of average number of recipients per email for morning, day, night. (Table 2)

TABLE 2

| Average Number of Recipients of Email by Time of Day | Account A | Account B |
|---|---|---|
| Morning | 1 | 15 |
| Day | 5 | 15 |
| Night | 1 | 15 |

Profile 3: Histogram of cumulative number of distinct email account recipients per email sent (which may be plotted as a function, or even represented by a closed form functional description modeled as a linear function, or a quadratic function, etc.)

TABLE 3

| Cumulative Distinct Email account recipients | Account A | Account B |
|---|---|---|
| Email 1 | 1 | 15 |
| Email 2 | 1 | 27 |
| Email 3 | 2 | 43 |
| ... | ... | ... |
| Email 55 | 7 | 1236 |

Given these three profiles, Account A appears to have a profile showing very modest use of emails, with few recipients. Account B on the other hand appears to be a heavy transmitter of emails. In addition, there seems to be evidence that the behavior of Account B is indicative of a 'drone' spammer. Such determination may be made by comparing the histograms of Account A (considered a "normal" user) with the histograms of Account B, and determining the difference between the two. Equations (1)-(8), above, are useful for this purpose. For example, the histogram of Table 2 indicates that the behavior of Account B may be consistent with running a program that is automatically sending emails to a fixed number of recipients (e.g., 15), and the histogram of Table 3 indicates that there is a very large number of email addresses in Account B's address book. In the illustration, Account B has already generated 1236 distinct addresses by email 55. The inference can therefore be made that Account B is a spammer. This type of profile can be used to find other similar profiles of other accounts indicative of other spammers.

It will be understood that the foregoing is only illustrative of the principles of the invention, and that various modifications can be made by those skilled in the art without departing from the scope and spirit of the invention.

Appendix

Adapted from C. Bron and J. Kerbosch. "*Algorithm 457: Finding All Cliques of an Undirected Graph*," Communications of ACM, 16:575—577, 1973

A maximal complete subgraph (clique) is a complete subgraph that is not contained in any other complete subgraph. Two backtracking algorithms are presented using a branch-and-bound technique (as discussed in Little, John et al., "An algorithm for the traveling Salesman Problem," Oper. Res. 11 (1963), 972-989) to cut off branches that cannot lead to a clique.

The first version is a straightforward implementation of the basic algorithm. It is mainly presented to illustrate the method used. This version generates cliques in alphabetic (lexicographic) order.

The second version is derived from the first and generates cliques in a rather unpredictable order in an attempt to minimize the number of branches to be; traversed. This version tends to produce the larger cliques first and to generate sequentially cliques having a large common intersection. The detailed algorithm for version 2 is presented here.

Description of the Algorithm—Version 1. Three sets play an important role in the algorithm. (1) The set compsub is the set to be extended by a new point or shrunk by one point on traveling along a branch of the backtracking tree. The points that are eligible to extend compsub, i.e. that are connected to all points in compsub, are collected recursively in the remaining two sets. (2) The set candidates is the set of all points that will in due time serve as an extension to the present configuration of compsub (3) The set not is the set of all points that have at an earlier stage already served as an extension of the present configuration of compsub and are now explicitly excluded. The reason for maintaining this set not will soon be made clear.

The core of the algorithm consists of a recursively defined extension operator that will be applied to the three sets just described. It has the duty to generate all extensions of the given configuration of compsub that it can make with the given set of candidates and that do not contain any of the points in not. To put it differently: all extensions of compsub containing any point in not have already been generated. The basic mechanism now consists of the following five steps:

Step 1. Selection of a candidate.

Step 2. Adding the selected candidate to compsub.

Step 3. Creating new sets candidates and not from the old sets by removing all points not connected to the selected candidate (to remain consistent with the definition), keeping the old sets in tact.

Step 4. Calling the extension operator to operate on the sets just formed.

Step 5. Upon return, removal of the selected candidate from compsub and its addition to the old set not.

The extra labor involved in maintaining the sets not is now described. A necessary condition for having created a clique is that the set candidates be empty; otherwise compsub could still be extended. This condition, however, is not sufficient, because if now not is nonempty, from the definition of not indicates that the present configuration of compsub has already been contained in another configuration and is therefore not maximal. Compsub is considered a clique as soon as both not and candidates are empty.

If at some stage not contains a point connected to all points in candidates, it can be predicted that further extensions (further selection of candidates) will never lead to the removal (in Step 3) of that particular point from subsequent configurations of not and, therefore, not to a clique. This is the branch and bound method which enables detection in an early stage of branches of the backtracking tree that do not lead to successful endpoints.

The set compsub behaves like a stack and can be maintained and updated in the form of a global array. The sets candidates and not are handed to the extensions operator as a parameter. The operator then declares a local array, in which the new sets are built up, that will be handed to the inner call. Both sets are stored in a single one-dimensional array with the following layout:

|not|candidates index values: 1 . . . ne . . . ce . . .

The following properties obviously hold:

1. $ne \leq ce$
2. $ne = ce$ :empty (candidates)
3. $ne = 0$ :empty (not)
4. $ce = 0$ :empty (not) and empty (candidates)
   = clique found If the selected candidate is in array position ne+1, then the second part of Step 5 is implemented as ne:=ne+1.

In version 1 we use element ne+1 as the selected candidate. This strategy never gives rise to internal shuffling, and thus all cliques are generated in a lexicographic ordering according to the initial ordering of the candidates (all points) in the outer call.

Description of the Algorithm—Version 2. This version does not select the candidate in position ne+1, but a well-chosen candidate from position, say s. In order to be able to complete Step 5 as simply as described above, elements s and ne+1 will be interchanged as soon as selection has taken place. This interchange does not affect the set candidates since there is not implicit ordering. The selection does affect, however, the order in which the cliques are eventually generated.

The term "well chosen" is now explained. The object is to minimize the number of repetitions of Steps 1-5 inside the extension operator. The repetitions terminate as soon as the bound condition is reached. This condition is formulated as: there exists a point in not connected to all points in candidates. We would like the existence of such a point to come about at the earliest possible stage.

It is assumed that with every point in not is associated a counter, which counts the number of candidates that this point is not connected to (number of disconnections). Moving a selected candidate into not (this occurs after extension) decreases by one all counters of the points in not to which it is disconnected and introduces a new counter of its own. Note that no counter is ever decreased by more than one at any one instant. Whenever a counter goes to zero the bound condition has been reached.

One particular point in not is fixed. If candidates disconnected to this fixed point are selected repeatedly, the counter of the fixed point will be decreased by one at every repetition. No other counter can go down more rapidly. If, to begin with, the fixed point has the lowest counter, no other counter can reach zero sooner, as long as the counters for points newly added to not cannot be smaller. We see to this requirement upon entry into the extension operator, where the fixed point is taken either from not or from the original candidates, whichever point yields the lowest counter value after the first addition to not. From that moment on this one counter is maintained, decreasing it for every next selection, since only select disconnected points are selected.

The Algol 60 implementation of this version is given below. The implementation in the exemplary embodiment is Clique_finder in the attached computer listing.

Algorithm

```
procedure output maximal complete subgraphs 2(connected, N);
    value N; integer N;
    Boolean array connected;
comment The input graph is expected in the form of a symmetrical
    boolean matrix connected. N is the number of nodes in the graph.
    The values of the diagonal elements should be true;
begin
    integer array ALL, compsub [1 : N];
    integer c;
    procedure extend version 2(old, ne, ce);
        value ne, ce; integer ne, ce;
        integer array old;
    begin
        integer array new [1 : ce];
        integer nod, fixp;
        integer newne, newce, i, j, count, pos, p, s, sel, minnod;
        comment The latter set of integers is local in scope but
            need not be declared recursively;
        minnod : = ce; i := nod : = 0;
DETERMINE EACH COUNTER VALUE AND LOOK FOR
MINIMUM:
        for i := i + 1 while i ≤ ce ∧ minnod 0 do
        begin
            p : = old[i]; count :=0; i := ne;
COUNT DISCONNECTION:
        for j : = j + 1 while j ≤ ce ∧ count < minnod do
            if ⌉ connecte[p, old[j]] then
            begin
                count :=count + 1;
SAVE POSITION OF POTENTIAL CANDIDATE:
                pos : = j
        end;
TEST NEW MINIMUM:
            if count < minnod then
            begin
                fixp : = p; minnod : = count;
                if i ≤ ne then s : = pos
                else
                begin s : = i; PREINCR: nod : = 1 end
            end NEW MINIMUM;
        end i;
        comment If fixed point initially chosen from candidates
        then number of disconnections will be preincreased by one;
BACKTRACKCYCLE:
        for nod : = minnod + nod step − 1 until 1 do
        begin
INTERCHANGE:
            p : = old[s]; old[s] : = old[ne + 1];
            sel : = old [ne + 1] : = p;
FILL NEW SET not:
            newne : = i : = 0;
            for i : = i + 1 while i ≤ ne do
                if connected [sel, old[i]] then
                begin newne : = newne + 1; new[newne]: : = old[i] end;
FILL NEW SET cand:
            newce : = newne; i : = ne + 1;
            for i : = i + 1 while i ≤ ce do
                if connected[sel, old[i]] then
                begin newce : = newce + 1; new[newce] : = old[i] end;
ADD TO compsub:
            c : = c + 1; compsub [c] : = sel;
            if newce = 0 then
            begin
                integer loc;
                outstring (1, 'clique = ');
                for loc : = 1 step 1 until c do
                    outinteger (1, compsub[loc])
            end output of clique
            else
            if newne < newce then extend version 2(new, newne, newce);
REMOVE FROM compsub:
            c : = c − 1;
ADD TO not:
            ne : = ne + 1;
            if nod > 1 then
            begin
SELECT A CANDIDATE DISCONNECTED TO THE FIXED POINT:
                s : = ne;
```

-continued

```
LOOK: FOR CANDIDATE:
                s : = s + 1;
                if connected[fixp, old[s]] then go to LOOK
            end selection
        end BACKTRACKCYCLE
        end extend version 2;
        for c : = 1 step 1 until N do ALL[c] : = c;
        c : = 0; extend version 2 (ALL, 0, N)
end output maximal complete subgraphs 2;
```

What is claimed is:

1. A method for monitoring transmission of email through a computer system, said computer system comprising a server and one or more clients having an email account, the method comprising:
    (a) gathering statistics relating to transmission behavior of prior emails relating to a first email account on said computer system;
    (b) generating a profile relating to the transmission behavior of email relating to said first email account based on said statistics, wherein generating a profile comprises grouping email addresses into one or more cliques based on the prior occurrence of email addresses within the same emails in a group of mails; and
    (c) determining if a violation of email security has occurred by comparing one or more select emails relating to said first email account to said profile.

2. The method according to claim 1, wherein gathering statistics relating to the transmission behavior of prior emails comprises gathering statistics relating to the email addresses of emails sent to said first email account.

3. The method according to claim 1, wherein gathering statistics relating to the transmission behavior of prior emails comprises gathering statistics relating to the email addresses of email sent by said first email account.

4. The method according to claim 1, wherein gathering statistics relating to the transmission behavior of prior emails comprises gathering statistics relating to the number of emails sent by said first email account.

5. The method according to claim 1, wherein gathering statistics relating to the transmission behavior of prior emails comprises gathering statistics relating to the transmission of email between said first email account and one or more additional email accounts.

6. The method according to claim 5, wherein gathering statistics relating to the transmission behavior of prior emails further comprises gathering statistics relating to the number of emails transmitted between said first email account and said one or more additional email accounts.

7. The method according to claim 6, wherein generating a profile relating to the transmission behavior of email further comprises ordering said one or more additional email accounts according to the number of emails transmitted between said first email account and each of said respective additional email accounts.

8. The method according to claim 6, wherein generating a profile relating to the transmission behavior of email further comprises grouping said one or more additional email accounts according to the number of mails transmitted between said first email account and each of said respective additional email accounts.

9. The method according to claim 5, wherein generating a profile relating to the transmission behavior of email further comprises grouping said one or more additional email accounts according to the domain of each of said additional email accounts.

10. The method according to claim 1, wherein gathering statistics relating to the transmission behavior of prior emails further comprises assigning a unique identifier to each email sent to said first email account.

11. The method according to claim 5, wherein gathering statistics relating to the transmission behavior of prior emails further comprises assigning a unique identifier to each email sent between said first email account and one or more additional email accounts.

* * * * *